United States Patent
El-Ghoroury

(10) Patent No.: US 10,453,431 B2
(45) Date of Patent: Oct. 22, 2019

(54) INTEGRATED NEAR-FAR LIGHT FIELD DISPLAY SYSTEMS

(71) Applicant: Ostendo Technologies, Inc., Carlsbad, CA (US)

(72) Inventor: Hussein S. El-Ghoroury, Carlsbad, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 0 days.

(21) Appl. No.: 15/499,603

(22) Filed: Apr. 27, 2017

(65) Prior Publication Data

US 2017/0316762 A1  Nov. 2, 2017

Related U.S. Application Data

(60) Provisional application No. 62/329,111, filed on Apr. 28, 2016.

(51) Int. Cl.
*G06T 15/00* (2011.01)
*G09G 5/391* (2006.01)
(Continued)

(52) U.S. Cl.
CPC ......... *G09G 5/391* (2013.01); *G02B 27/0093* (2013.01); *G02B 27/0101* (2013.01); *G02B 27/0172* (2013.01); *G06F 3/012* (2013.01); *G06F 3/013* (2013.01); *G06F 3/017* (2013.01); *G06F 3/0346* (2013.01); *G06F 3/1423* (2013.01); *G09G 3/003* (2013.01);
(Continued)

(58) Field of Classification Search
CPC ...... G06T 2207/20041; G06T 2200/24; G09G 5/391; G09G 27/0172; G09G 27/0093; G09G 27/0101; G06F 3/013; G06F 3/012; G06F 3/017; G06F 3/0346; G02B 2027/014; G02B 2027/0118; G02B 2027/0112; G02B 2027/0178; G02B 2027/0147
USPC .......................................................... 345/418
See application file for complete search history.

(56) References Cited

U.S. PATENT DOCUMENTS 4,427,912 A   1/1984 Bui et al.
4,987,410 A   1/1991 Berman et al.
(Continued)

FOREIGN PATENT DOCUMENTS

CN   101430426   5/2009
CN   103298410   9/2013
(Continued)

OTHER PUBLICATIONS

Akeley K, Watt SJ, Girshick AR, Banks MS. A stereo display prototype with multiple focal distances. InACM transactions on graphics (TOG) Aug. 8, 2004 (vol. 23, No. 3, pp. 804-813). ACM.*
(Continued)

*Primary Examiner* — Phu K Nguyen
(74) *Attorney, Agent, or Firm* — Womble Bond Dickinson (US) LLP

(57) ABSTRACT

Complementary near-field and far-field light field displays (LFDs) are provided. A distributed LFD system is disclosed in which the light field is cooperatively displayed by a direct view LFD and a near-eye LFD. The two display components of the system work together synchronously to display a high-fidelity 3D experience to one or multiple viewers.

45 Claims, 10 Drawing Sheets

(51) Int. Cl.
  *G02B 27/00* (2006.01)
  *G02B 27/01* (2006.01)
  *G06F 3/01* (2006.01)
  *G06F 3/0346* (2013.01)
  *G06F 3/14* (2006.01)
  *G09G 3/00* (2006.01)

(52) U.S. Cl.
  CPC .............. *G02B 2027/014* (2013.01); *G02B 2027/0112* (2013.01); *G02B 2027/0118* (2013.01); *G02B 2027/0127* (2013.01); *G02B 2027/0147* (2013.01); *G02B 2027/0178* (2013.01); *G09G 2340/0407* (2013.01); *G09G 2356/00* (2013.01)

(56) References Cited

U.S. PATENT DOCUMENTS

| | | |
|---|---|---|
| 5,162,828 A | 11/1992 | Furness et al. |
| 5,368,042 A | 11/1994 | O'Neal et al. |
| 5,613,048 A | 3/1997 | Chen et al. |
| 5,619,373 A | 4/1997 | Meyerhofer et al. |
| 5,696,521 A | 12/1997 | Robinson et al. |
| 5,818,359 A | 10/1998 | Beach |
| 5,886,822 A | 3/1999 | Spitzer |
| 5,986,811 A | 11/1999 | Wohlstadter |
| 6,009,188 A | 12/1999 | Cohen et al. |
| 6,091,767 A | 7/2000 | Westerman |
| 6,097,394 A | 8/2000 | Levoy et al. |
| 6,128,003 A | 10/2000 | Smith et al. |
| 6,147,807 A | 11/2000 | Droessler et al. |
| 6,151,167 A | 11/2000 | Melville |
| 6,252,989 B1 | 6/2001 | Geisler et al. |
| 6,353,503 B1 | 3/2002 | Spitzer et al. |
| 6,433,907 B1 | 8/2002 | Lippert et al. |
| 6,456,438 B1 | 9/2002 | Lee et al. |
| 6,522,794 B1 | 2/2003 | Bischel et al. |
| 6,529,331 B2 | 3/2003 | Massof et al. |
| 6,549,308 B1 | 4/2003 | Camahort |
| 6,666,825 B2 | 12/2003 | Smith et al. |
| 6,710,902 B2 | 3/2004 | Takeyama |
| 6,719,693 B2 | 4/2004 | Richard |
| 6,738,533 B1 | 5/2004 | Shum et al. |
| 6,795,221 B1 | 9/2004 | Urey |
| 6,803,561 B2 | 10/2004 | Dunfield |
| 6,804,066 B1 | 10/2004 | Ha et al. |
| 6,829,095 B2 | 12/2004 | Amitai |
| 6,924,476 B2 | 8/2005 | Wine et al. |
| 6,937,221 B2 | 8/2005 | Lippert et al. |
| 6,963,431 B2 | 11/2005 | Holzbach et al. |
| 6,984,208 B2 | 1/2006 | Zheng |
| 6,999,238 B2 | 2/2006 | Glebov et al. |
| 7,061,450 B2 | 6/2006 | Bright et al. |
| 7,071,594 B1 | 7/2006 | Yan et al. |
| 7,106,519 B2 | 9/2006 | Aizenberg et al. |
| 7,190,329 B2 | 3/2007 | Lewis et al. |
| 7,193,758 B2 | 3/2007 | Wiklof et al. |
| 7,209,271 B2 | 4/2007 | Lewis et al. |
| 7,215,475 B2 | 5/2007 | Woodgate et al. |
| 7,232,071 B2 | 6/2007 | Lewis et al. |
| 7,369,321 B1 | 5/2008 | Ren et al. |
| 7,404,645 B2 | 7/2008 | Margulis |
| 7,482,730 B2 | 1/2009 | Davis et al. |
| 7,486,255 B2 | 2/2009 | Brown et al. |
| 7,545,571 B2 | 6/2009 | Garoutte et al. |
| 7,580,007 B2 | 8/2009 | Brown et al. |
| 7,619,807 B2 | 11/2009 | Baek et al. |
| 7,623,560 B2 | 11/2009 | El-Ghoroury et al. |
| 7,724,210 B2 | 5/2010 | Sprague et al. |
| 7,747,301 B2 | 6/2010 | Cheng et al. |
| 7,767,479 B2 | 8/2010 | El-Ghoroury et al. |
| 7,791,810 B2 | 9/2010 | Powell |
| 7,829,902 B2 | 11/2010 | El-Ghoroury et al. |
| 7,952,809 B2 | 5/2011 | Takai |
| 7,978,407 B1 | 7/2011 | Connor |
| 8,049,231 B2 | 11/2011 | El-Ghoroury et al. |
| 8,098,265 B2 | 1/2012 | El-Ghoroury et al. |
| 8,155,456 B2 | 4/2012 | Babacan et al. |
| 8,243,770 B2 | 8/2012 | El-Ghoroury et al. |
| 8,279,716 B1 | 10/2012 | Gossweiler, III et al. |
| 8,284,237 B2 | 10/2012 | Chen et al. |
| 8,292,833 B2 | 10/2012 | Son et al. |
| 8,315,476 B1 | 11/2012 | Georgiev et al. |
| 8,334,889 B2 | 12/2012 | Blanche et al. |
| 8,401,316 B2 | 3/2013 | Babacan et al. |
| 8,405,618 B2 | 3/2013 | Colgate et al. |
| 8,471,967 B2 | 6/2013 | Miao et al. |
| 8,477,425 B2 | 7/2013 | Border et al. |
| 8,482,859 B2 * | 7/2013 | Border ............... G02B 27/017 353/28 |
| 8,508,830 B1 | 8/2013 | Wang |
| 8,508,851 B2 | 8/2013 | Miao et al. |
| 8,510,244 B2 | 8/2013 | Carson et al. |
| 8,553,910 B1 | 10/2013 | Dong et al. |
| 8,567,960 B2 | 10/2013 | El-Ghoroury et al. |
| 8,619,049 B2 | 12/2013 | Harrison et al. |
| 8,681,185 B2 | 3/2014 | Guncer |
| 8,725,842 B1 | 5/2014 | Al-Nasser |
| 8,743,145 B1 | 6/2014 | Price |
| 8,773,599 B2 | 7/2014 | Saeedi et al. |
| 8,854,724 B2 | 10/2014 | El-Ghoroury et al. |
| 8,913,004 B1 | 12/2014 | Bozarth et al. |
| 8,928,969 B2 | 1/2015 | Alpaslan et al. |
| 8,970,646 B2 | 3/2015 | Guncer |
| 8,975,713 B2 | 3/2015 | Sako et al. |
| 9,097,890 B2 * | 8/2015 | Miller ............... G02B 27/0093 |
| 9,110,504 B2 * | 8/2015 | Lewis .................. A61B 3/113 |
| 9,129,183 B2 | 9/2015 | Venkataraman et al. |
| 9,134,535 B2 | 9/2015 | Dobschal et al. |
| 9,179,126 B2 | 11/2015 | El-Ghoroury et al. |
| 9,195,053 B2 | 11/2015 | El-Ghoroury et al. |
| 9,239,453 B2 | 1/2016 | Cheng et al. |
| 9,244,277 B2 | 1/2016 | Cheng et al. |
| 9,244,539 B2 | 1/2016 | Venable et al. |
| 9,274,608 B2 * | 3/2016 | Katz ...................... G06F 3/017 |
| 9,286,730 B2 | 3/2016 | Bar-Zeev et al. |
| 9,524,682 B2 | 12/2016 | El-Ghoroury et al. |
| 9,529,191 B2 * | 12/2016 | Sverdrup ............ G02B 27/017 |
| 9,538,182 B2 * | 1/2017 | Mishourovsky ..... H04N 19/597 |
| 9,681,069 B2 | 6/2017 | El-Ghoroury et al. |
| 9,712,764 B2 | 7/2017 | El-Ghoroury et al. |
| 9,769,365 B1 | 9/2017 | Jannard |
| 9,774,800 B2 | 9/2017 | El-Ghoroury et al. |
| 9,779,515 B2 | 10/2017 | El-Ghoroury et al. |
| 9,965,982 B2 * | 5/2018 | Lapstun ................ G02B 26/10 |
| 2002/0008854 A1 | 1/2002 | Leigh Travis |
| 2002/0017567 A1 | 2/2002 | Connolly et al. |
| 2002/0024495 A1 | 2/2002 | Lippert et al. |
| 2002/0067521 A1 | 6/2002 | Holzbach et al. |
| 2002/0075232 A1 | 6/2002 | Daum et al. |
| 2002/0083164 A1 | 6/2002 | Katayama et al. |
| 2002/0141026 A1 | 10/2002 | Wiklof et al. |
| 2002/0158814 A1 | 10/2002 | Bright et al. |
| 2002/0181115 A1 | 12/2002 | Massof et al. |
| 2002/0194005 A1 | 12/2002 | Lahr |
| 2003/0032884 A1 | 2/2003 | Smith et al. |
| 2003/0086135 A1 | 5/2003 | Takeyama |
| 2003/0122066 A1 | 7/2003 | Dunfield |
| 2003/0138130 A1 | 7/2003 | Cohen et al. |
| 2003/0184575 A1 | 10/2003 | Reho et al. |
| 2003/0187357 A1 | 10/2003 | Richard |
| 2004/0004585 A1 | 1/2004 | Brown et al. |
| 2004/0024312 A1 | 2/2004 | Zheng |
| 2004/0051392 A1 | 3/2004 | Badarneh |
| 2004/0080807 A1 | 4/2004 | Chen et al. |
| 2004/0080938 A1 | 4/2004 | Holman et al. |
| 2004/0085261 A1 | 5/2004 | Lewis et al. |
| 2004/0119004 A1 | 6/2004 | Wine et al. |
| 2004/0125076 A1 | 7/2004 | Green |
| 2004/0138935 A1 | 7/2004 | Johnson et al. |
| 2004/0179254 A1 | 9/2004 | Lewis et al. |
| 2004/0240064 A1 | 12/2004 | Dutta |
| 2005/0002074 A1 | 1/2005 | McPheters et al. |
| 2005/0018911 A1 | 1/2005 | Deever |

(56) References Cited

U.S. PATENT DOCUMENTS

| | | |
|---|---|---|
| 2005/0024730 A1 | 2/2005 | Aizenberg et al. |
| 2005/0053192 A1 | 3/2005 | Sukovic et al. |
| 2005/0116038 A1 | 6/2005 | Lewis et al. |
| 2005/0117195 A1 | 6/2005 | Glebov et al. |
| 2005/0168700 A1 | 8/2005 | Berg et al. |
| 2005/0179976 A1 | 8/2005 | Davis et al. |
| 2005/0264502 A1 | 12/2005 | Sprague et al. |
| 2006/0017655 A1 | 1/2006 | Brown et al. |
| 2006/0132383 A1 | 6/2006 | Gally et al. |
| 2006/0152812 A1 | 7/2006 | Woodgate et al. |
| 2006/0253007 A1 | 11/2006 | Cheng et al. |
| 2006/0285192 A1 | 12/2006 | Yang |
| 2006/0290663 A1 | 12/2006 | Mitchell |
| 2007/0035706 A1 | 2/2007 | Margulis |
| 2007/0052694 A1 | 3/2007 | Holmes |
| 2007/0083120 A1 | 4/2007 | Cain et al. |
| 2007/0229653 A1 | 10/2007 | Matusik et al. |
| 2007/0236450 A1 | 10/2007 | Colgate et al. |
| 2007/0269432 A1 | 11/2007 | Nakamura et al. |
| 2007/0276658 A1 | 11/2007 | Douglass |
| 2008/0002262 A1 | 1/2008 | Chirieleison |
| 2008/0043095 A1 | 2/2008 | Vetro et al. |
| 2008/0043096 A1 | 2/2008 | Vetro et al. |
| 2008/0049291 A1 | 2/2008 | Baek et al. |
| 2008/0130069 A1 | 6/2008 | Cernasov |
| 2008/0141316 A1 | 6/2008 | Igoe et al. |
| 2008/0187305 A1 | 8/2008 | Raskar et al. |
| 2008/0198920 A1 | 8/2008 | Yang et al. |
| 2008/0239452 A1 | 10/2008 | Xu et al. |
| 2009/0073559 A1 | 3/2009 | Woodgate et al. |
| 2009/0086170 A1 | 4/2009 | El-Ghoroury et al. |
| 2009/0096746 A1 | 4/2009 | Kruse et al. |
| 2009/0161191 A1 | 6/2009 | Powell |
| 2009/0199900 A1 | 8/2009 | Bita et al. |
| 2009/0222113 A1 | 9/2009 | Fuller et al. |
| 2009/0256287 A1 | 10/2009 | Fu et al. |
| 2009/0268303 A1 | 10/2009 | Takai |
| 2009/0268970 A1 | 10/2009 | Babacan et al. |
| 2009/0278998 A1 | 11/2009 | El-Ghoroury et al. |
| 2009/0327171 A1 | 12/2009 | Tan et al. |
| 2010/0003777 A1 | 1/2010 | El-Ghoroury et al. |
| 2010/0007804 A1 | 1/2010 | Guncer |
| 2010/0026960 A1 | 2/2010 | Sprague |
| 2010/0046070 A1 | 2/2010 | Mukawa |
| 2010/0046848 A1 | 2/2010 | Witzgall |
| 2010/0053164 A1 | 3/2010 | Imai et al. |
| 2010/0056274 A1 | 3/2010 | Uusitalo et al. |
| 2010/0066921 A1 | 3/2010 | El-Ghoroury et al. |
| 2010/0091050 A1 | 4/2010 | El-Ghoroury et al. |
| 2010/0156676 A1 | 6/2010 | Mooring et al. |
| 2010/0156894 A1 | 6/2010 | Holler et al. |
| 2010/0171922 A1 | 7/2010 | Sessner et al. |
| 2010/0199232 A1 | 8/2010 | Mistry et al. |
| 2010/0220042 A1 | 9/2010 | El-Ghoroury et al. |
| 2010/0225679 A1 | 9/2010 | Guncer |
| 2010/0231585 A1 | 9/2010 | Weiblen |
| 2010/0241601 A1 | 9/2010 | Carson et al. |
| 2010/0245957 A1 | 9/2010 | Hudman et al. |
| 2010/0259472 A1 | 10/2010 | Radivojevic et al. |
| 2010/0265385 A1 | 10/2010 | Knight et al. |
| 2010/0267449 A1 | 10/2010 | Gagner et al. |
| 2010/0309287 A1 | 12/2010 | Rodriguez |
| 2011/0054360 A1 | 3/2011 | Son et al. |
| 2011/0058021 A1 | 3/2011 | Chen et al. |
| 2011/0115887 A1 | 5/2011 | Yoo et al. |
| 2011/0134227 A1 | 6/2011 | Shin |
| 2011/0221659 A1 | 9/2011 | King, III et al. |
| 2011/0255592 A1 | 10/2011 | Sung et al. |
| 2011/0261050 A1 | 10/2011 | Smolic et al. |
| 2011/0285666 A1 | 11/2011 | Poupyrev et al. |
| 2011/0285667 A1 | 11/2011 | Poupyrev et al. |
| 2012/0033113 A1 | 2/2012 | El-Ghoroury et al. |
| 2012/0050481 A1 | 3/2012 | Chen et al. |
| 2012/0069154 A1 | 3/2012 | Talstra et al. |
| 2012/0075173 A1 | 3/2012 | Ashbrook et al. |
| 2012/0075196 A1 | 3/2012 | Ashbrook et al. |
| 2012/0105310 A1* | 5/2012 | Sverdrup ............. G02B 27/017 345/8 |
| 2012/0113097 A1 | 5/2012 | Nam et al. |
| 2012/0120498 A1 | 5/2012 | Harrison et al. |
| 2012/0143358 A1 | 6/2012 | Adams et al. |
| 2012/0154441 A1 | 6/2012 | Kim |
| 2012/0157203 A1 | 6/2012 | Latta et al. |
| 2012/0183232 A1 | 7/2012 | Babacan et al. |
| 2012/0195461 A1 | 8/2012 | Lawrence Ashok Inigo |
| 2012/0212398 A1 | 8/2012 | Border et al. |
| 2012/0212399 A1 | 8/2012 | Border et al. |
| 2012/0213270 A1 | 8/2012 | Baraniuk et al. |
| 2012/0218301 A1 | 8/2012 | Miller |
| 2012/0236201 A1 | 9/2012 | Larsen et al. |
| 2012/0249409 A1 | 10/2012 | Toney et al. |
| 2012/0249741 A1 | 10/2012 | Maciocci et al. |
| 2012/0288995 A1 | 11/2012 | El-Ghoroury et al. |
| 2012/0290943 A1 | 11/2012 | Toney et al. |
| 2012/0293402 A1 | 11/2012 | Harrison et al. |
| 2012/0299962 A1 | 11/2012 | White et al. |
| 2012/0309455 A1 | 12/2012 | Klose et al. |
| 2012/0319940 A1 | 12/2012 | Bress et al. |
| 2012/0320092 A1 | 12/2012 | Shin et al. |
| 2012/0327139 A1 | 12/2012 | Margulis |
| 2013/0010057 A1 | 1/2013 | Borel et al. |
| 2013/0016292 A1 | 1/2013 | Miao et al. |
| 2013/0021658 A1 | 1/2013 | Miao et al. |
| 2013/0027341 A1 | 1/2013 | Mastandrea |
| 2013/0041477 A1 | 2/2013 | Sikdar et al. |
| 2013/0050260 A1 | 2/2013 | Reitan |
| 2013/0050786 A1 | 2/2013 | Lucente |
| 2013/0077880 A1 | 3/2013 | Venkataraman et al. |
| 2013/0077882 A1 | 3/2013 | Venkataraman et al. |
| 2013/0080890 A1 | 3/2013 | Krishnamurthi |
| 2013/0083303 A1 | 4/2013 | Hoover et al. |
| 2013/0100362 A1 | 4/2013 | Saeedi et al. |
| 2013/0141895 A1 | 6/2013 | Alpaslan et al. |
| 2013/0162505 A1 | 6/2013 | Crocco et al. |
| 2013/0169536 A1 | 7/2013 | Wexler et al. |
| 2013/0176622 A1 | 7/2013 | Abrahamsson et al. |
| 2013/0187836 A1 | 7/2013 | Cheng et al. |
| 2013/0196757 A1 | 8/2013 | Latta et al. |
| 2013/0215516 A1 | 8/2013 | Dobschal et al. |
| 2013/0222633 A1 | 8/2013 | Knight et al. |
| 2013/0225999 A1 | 8/2013 | Banjanin et al. |
| 2013/0258451 A1 | 10/2013 | El-Ghoroury et al. |
| 2013/0271679 A1 | 10/2013 | Sakamoto et al. |
| 2013/0282639 A1 | 10/2013 | Potkonjak |
| 2013/0285174 A1 | 10/2013 | Sako et al. |
| 2013/0286053 A1 | 10/2013 | Fleck et al. |
| 2013/0286178 A1 | 10/2013 | Lewis et al. |
| 2013/0294504 A1 | 11/2013 | Mishourovsky et al. |
| 2013/0321581 A1 | 12/2013 | El-Ghoroury et al. |
| 2013/0342644 A1 | 12/2013 | Rusanovskyy et al. |
| 2014/0002675 A1 | 1/2014 | Duparre et al. |
| 2014/0009845 A1 | 1/2014 | Cheng et al. |
| 2014/0024132 A1 | 1/2014 | Jia et al. |
| 2014/0049417 A1 | 2/2014 | Abdurrahman et al. |
| 2014/0049983 A1 | 2/2014 | Nichol et al. |
| 2014/0055352 A1 | 2/2014 | David et al. |
| 2014/0055692 A1 | 2/2014 | Kroll et al. |
| 2014/0079336 A1 | 3/2014 | Venkataraman et al. |
| 2014/0085177 A1 | 3/2014 | Lyons et al. |
| 2014/0091984 A1 | 4/2014 | Ashbrook et al. |
| 2014/0092281 A1 | 4/2014 | Nisenzon et al. |
| 2014/0098018 A1 | 4/2014 | Kim et al. |
| 2014/0098067 A1 | 4/2014 | Yang et al. |
| 2014/0098189 A1 | 4/2014 | Deng et al. |
| 2014/0118252 A1 | 5/2014 | Kim et al. |
| 2014/0129207 A1 | 5/2014 | Bailey et al. |
| 2014/0139454 A1 | 5/2014 | Mistry et al. |
| 2014/0139576 A1 | 5/2014 | Costa et al. |
| 2014/0146201 A1 | 5/2014 | Knight et al. |
| 2014/0147035 A1 | 5/2014 | Ding et al. |
| 2014/0168062 A1* | 6/2014 | Katz ..................... G06F 3/017 345/156 |
| 2014/0176417 A1 | 6/2014 | Young et al. |
| 2014/0185142 A1 | 7/2014 | Gupta et al. |

(56) References Cited

U.S. PATENT DOCUMENTS

| | | |
|---|---|---|
| 2014/0200496 A1 | 7/2014 | Hyde et al. |
| 2014/0210823 A1 | 7/2014 | Maguire, Jr. |
| 2014/0219558 A1 | 8/2014 | Teng et al. |
| 2014/0232651 A1 | 8/2014 | Kress et al. |
| 2014/0232822 A1 | 8/2014 | Venkataraman et al. |
| 2014/0267228 A1 | 9/2014 | Ofek et al. |
| 2014/0285429 A1 | 9/2014 | Simmons |
| 2014/0292620 A1* | 10/2014 | Lapstun ............... G02B 26/10 345/6 |
| 2014/0300869 A1 | 10/2014 | Hirsch et al. |
| 2014/0301662 A1 | 10/2014 | Justice et al. |
| 2014/0304646 A1 | 10/2014 | Rossmann |
| 2014/0340304 A1 | 11/2014 | Dewan et al. |
| 2014/0340434 A1 | 11/2014 | El-Ghoroury et al. |
| 2014/0347361 A1 | 11/2014 | Alpaslan et al. |
| 2014/0375856 A1 | 12/2014 | Kaneko |
| 2015/0001987 A1 | 1/2015 | Masaki et al. |
| 2015/0033539 A1 | 2/2015 | El-Ghoroury et al. |
| 2015/0035832 A1 | 2/2015 | Sugden et al. |
| 2015/0054729 A1 | 2/2015 | Minnen et al. |
| 2015/0058102 A1 | 2/2015 | Christensen et al. |
| 2015/0125109 A1 | 5/2015 | Robbins et al. |
| 2015/0138086 A1 | 5/2015 | Underkoffler et al. |
| 2015/0148886 A1 | 5/2015 | Rao et al. |
| 2015/0178939 A1 | 6/2015 | Bradski et al. |
| 2015/0193984 A1 | 7/2015 | Bar-Zeev et al. |
| 2015/0201176 A1 | 7/2015 | Graziosi et al. |
| 2015/0205126 A1 | 7/2015 | Schowengerdt |
| 2015/0220109 A1 | 8/2015 | von Badinski et al. |
| 2015/0235467 A1 | 8/2015 | Schowengerdt et al. |
| 2015/0264223 A1 | 9/2015 | Akenine-Moller et al. |
| 2015/0277126 A1 | 10/2015 | Hirano et al. |
| 2015/0296203 A1 | 10/2015 | Lucente et al. |
| 2015/0301256 A1 | 10/2015 | Takiguchi |
| 2015/0301383 A1 | 10/2015 | Kimura |
| 2015/0312560 A1 | 10/2015 | Deering et al. |
| 2015/0319456 A1 | 11/2015 | Le Floch |
| 2015/0323990 A1 | 11/2015 | Maltz |
| 2015/0323998 A1 | 11/2015 | Kudekar et al. |
| 2015/0326842 A1 | 11/2015 | Huai |
| 2015/0381782 A1 | 12/2015 | Park |
| 2016/0018948 A1 | 1/2016 | Parvarandeh et al. |
| 2016/0021355 A1 | 1/2016 | Alpaslan et al. |
| 2016/0026059 A1 | 1/2016 | Chung et al. |
| 2016/0028935 A1 | 1/2016 | El-Ghoroury et al. |
| 2016/0116738 A1 | 4/2016 | Osterhout |
| 2016/0182782 A1 | 6/2016 | El-Ghoroury et al. |
| 2016/0191765 A1 | 6/2016 | El-Ghoroury et al. |
| 2016/0191823 A1 | 6/2016 | El-Ghoroury et al. |
| 2016/0220232 A1 | 8/2016 | Takada et al. |
| 2016/0342151 A1 | 11/2016 | Dey, IV et al. |
| 2016/0360177 A1 | 12/2016 | Graziosi et al. |
| 2017/0065872 A1 | 3/2017 | Kelley |
| 2017/0069134 A1 | 3/2017 | Shapira et al. |
| 2017/0116897 A1 | 4/2017 | Ahn et al. |
| 2017/0142427 A1 | 5/2017 | Graziosi et al. |
| 2017/0184776 A1 | 6/2017 | El-Ghoroury et al. |
| 2017/0236295 A1 | 8/2017 | El-Ghoroury |
| 2017/0261388 A1 | 9/2017 | Ma et al. |
| 2017/0264879 A1 | 9/2017 | Zhou |
| 2017/0310956 A1 | 10/2017 | Perdices-Gonzalez et al. |

FOREIGN PATENT DOCUMENTS

| | | |
|---|---|---|
| CN | 103503023 | 1/2014 |
| CN | 103546181 | 1/2014 |
| CN | 103558918 | 2/2014 |
| CN | 104081414 | 10/2014 |
| CN | 104216128 | 12/2014 |
| CN | 104460992 | 3/2015 |
| EP | 0431488 | 1/1996 |
| EP | 1978754 | 10/2008 |
| KR | 10-1552134 | 9/2015 |
| WO | WO-2008/146190 | 12/2008 |
| WO | WO-2010/108024 | 9/2010 |
| WO | WO-2011/065738 | 6/2011 |
| WO | WO-2012/149971 | 11/2012 |
| WO | WO-2013/049699 | 4/2013 |
| WO | WO-2014/124173 | 8/2014 |
| WO | WO-2015/106031 | 7/2015 |
| WO | WO-2016/172384 | 10/2016 |

OTHER PUBLICATIONS

Conti, Caroline et al., "Light-Field Video Coding Using Geometry-Based Disparity Compensation", 2014 3DTV-Conference: The True Vision—Capture, Transmission and Display of 3D Video (3DTV-CON), IEEE, Jul. 2, 2014, pp. 1-4.

Dricot, A. et al., "Integral Images Compression Scheme Based on View Extraction", 2015 23rd European Signal Processing Conference (EUSIPCO), Aug. 31, 2015, pp. 101-105.

Li, Yun et al., "Scalable Coding of Plenoptic Images by Using a Sparse Set and Disparities", IEEE Transactions on Image Processing, vol. 25, No. 1, Jan. 2016, pp. 80-91.

Zhang, Cha et al., "A survey on image-based rendering—representation, sampling and compression", Signal Processing: Image Communication, vol. 19, 2004, pp. 1-28.

Nam, Dongkyung et al., "Flat Panel Light-Field 3-D Display: Concept, Design, Rendering, and Calibration", Proceedings of the IEEE, vol. 105, No. 5, May 2017, pp. 876-891.

Ahumada, Jr., Albert J. et al., "Spatio-temporal discrimination model predicts temporal masking functions", Proceedings of SPIE—the International Society for Optical Engineering, Human vision and electronic imaging III, vol. 3299, 1998, 6 pp. total.

Beulen, Bart W. et al., "Toward Noninvasive Blood Pressure Assessment in Arteries by Using Ultrasound", Ultrasound in Medicine & Biology, vol. 37, No. 5, 2011, pp. 788-797.

Bickel, Bernd et al., "Capture and Modeling of Non-Linear Heterogeneous Soft Tissue", ACM Transactions on Graphics (TOG)—Proceedings of ACM SIGGRAPH 2009, vol. 28, Issue 3, Article No. 89, Aug. 2009, 9 pp. total.

Castellini, Claudio et al., "Using Ultrasound Images of the Forearm to Predict Finger Positions", IEEE Transactions on Neural Systems and Rehabilitation Engineering, vol. 20, No. 6, Nov. 2012, pp. 788-797.

Cobbold, Richard S., "Foundations of Biomedical Ultrasound", Oxford University Press, 2007, pp. 3-95.

Guo, Jing-Yi et al., "Dynamic monitoring of forearm muscles using one-dimensional sonomyography system", Journal of Rehabilitation Research & Development, vol. 45, No. 1, 2008, pp. 187-195.

Harrison, Chris et al., "Skinput: Appropriating the Body as an Input Surface", CHI '10 Proceedings of the SIGCHI Conference on Human Factors in Computing Systems, 2010, pp. 453-462.

Hsiao, Tzu-Yu et al., "Noninvasive Assessment of Laryngeal Phonation Function Using Color Doppler Ultrasound Imaging", Ultrasound in Med. & Biol., vol. 27, No. 8, 2001, pp. 1035-1040.

Keir, Peter J. et al., "Changes in geometry of the finger flexor tendons in the carpal tunnel with wrist posture and tendon load: an MRI study on normal wrists", Clinical Biomechanics, vol. 14, 1999, pp. 635-645.

Khuri-Yakub, Butrus T. et al., "Capacitive micromachined ultrasonic transducers for medical imaging and therapy", J. Micromech. Microeng., vol. 21, No. 5, May 2011, pp. 054004-054014.

Koutsouridis, G. G. et al., "Towards a Non-Invasive Ultrasound Pressure Assessment in Large Arteries", Technische Universiteit Eindhoven, University of Technology, Mate Poster Award 2010 : 15th Annual Poster Contest, 2010, 1 page total.

Legros, M. et al., "Piezocomposite and CMUT Arrays Assessment Through In Vitro Imaging Performances", 2008 IEEE Ultrasonics Symposium, Nov. 2-5, 2008, pp. 1142-1145.

Martin, Joel R. et al., "Changes in the flexor digitorum profundus tendon geometry in the carpal tunnel due to force production and posture of metacarpophalangeal joint of the index finger: An MRI study", Clinical Biomechanics, vol. 28, 2013, pp. 157-163.

Martin, Joel R. et al., "Effects of the index finger position and force production on the flexor digitorum superficialis moment arms at the

(56) References Cited

OTHER PUBLICATIONS metacarpophalangeal joints—a magnetic resonance imaging study", Clinical Biomechanics, vol. 27, 2012, pp. 453-459.

Mujibiya, Adiyan et al., "The Sound of Touch: On-body Touch and Gesture Sensing Based on Transdermal Ultrasound Propagation", ITS '13 Proceedings of the 2013 ACM international conference on Interactive tabletops and surfaces, Oct. 6-9, 2013, pp. 189-198.

Paclet, Florent et al., "Motor control theories improve biomechanical model of the hand for finger pressing tasks", Journal of Biomechanics, vol. 45, 2012, pp. 1246-1251.

Pinton, Gianmarco F. et al., "A Heterogeneous Nonlinear Attenuating Full-Wave Model of Ultrasound", IEEE Transactions on Ultrasonics, Ferroelectrics, and Frequency Control, vol. 56, No. 3, Mar. 2009, pp. 474-488.

Richard, William D. et al., "A scalable architecture for real-time synthetic-focus imaging", Ultrasonic Imaging, vol. 25, 2003, pp. 151-161.

Shi, Jun et al., "Feasibility of controlling prosthetic hand using sonomyography signal in real time: Preliminary study", Journal of Rehabilitation Research & Development, vol. 47, No. 2, 2010, pp. 87-97.

Sikdar, Siddhartha et al., "Novel Method for Predicting Dexterous Individual Finger Movements by Imaging Muscle Activity Using a Wearable Ultrasonic System", IEEE Transactions on Neural Systems and Rehabilitation Engineering, vol. 22, No. 1, Jan. 2014, pp. 69-76.

Sueda, Shinjiro et al., "Musculotendon Simulation for Hand Animation", ACM Transactions on Graphics (TOG)—Proceedings of ACM SIGGRAPH 2008, vol. 27 Issue 3, Article No. 83, vol. 27 Issue 3, Aug. 2008, 8 pp. total.

Szabo, Thomas L., "Diagnostic Ultrasound Imaging: Inside Out, Second Edition", Elsevier Inc., 2013, 829 pp. total.

Van Den Branden Lambrecht, Christian J., "A Working Spatio-Temporal Model of the Human Visual System for Image Restoration and Quality Assessment Applications", ICASSP-96, Conference Proceedings of the 1996 IEEE International Conference on Acoustics, Speech, and Signal Processing, May 1996, 4 pp. total.

Watson, Andrew B. et al., "Model of human visual-motion sensing", Journal of the Optical Society of America A, vol. 2, No. 2, Feb. 1985, pp. 322-342.

Watson, Andrew B. et al., "Model of visual contrast gain control and pattern masking", Journal of the Optical Society of America A, vol. 14, No. 9, Sep. 1997, pp. 2379-2391.

Watson, Andrew B., "The search for optimal visual stimuli", Vision Research, vol. 38, 1998, pp. 1619-1621.

Watson, Andrew B., "The Spatial Standard Observer: A Human Visual Model for Display Inspection", Society for Information Display, SID 06 Digest, Jun. 2006, pp. 1312-1315.

Watson, Andrew B., "Visual detection of spatial contrast patterns: Evaluation of five simple models", Optics Express, vol. 6, No. 1, Jan. 3, 2000, pp. 12-33.

Williams III, T. W., "Progress on stabilizing and controlling powered upper-limb prostheses", Journal of Rehabilitation Research & Development, Guest Editorial, vol. 48, No. 6, 2011, pp. ix-xix.

Willis, Karl D. et al., "Motion Beam: A Metaphor for Character Interaction with Handheld Projectors", CHI '11 Proceedings of the SIGCHI Conference on Human Factors in Computing Systems, May 7-12, 2011, pp. 1031-1040.

Yun, Xiaoping et al., "Design, Implementation, and Experimental Results of a Quaternion-Based Kalman Filter for Human Body Motion Tracking", IEEE Transactions on Robotics, vol. 22, No. 6, Dec. 2006, pp. 1216-1227.

Zhang, Cha et al., "Maximum Likelihood Sound Source Localization and Beamforming for Directional Microphone Arrays in Distributed Meetings", IEEE Transactions on Multimedia, vol. 10, No. 3, Apr. 2008, pp. 538-548.

Balogh, Tibor et al., "Real-time 3D light field transmission", SPIE Photonics Europe, vol. 7724, Apr. 16, 2010, pp. 772406-1 to 772406-7.

Huang, Fu-Chung et al., "The Light Field Stereoscope: Immersive Computer Graphics via Factored Near-Eye Light Field Displays with Focus Cues", ACM Transactions on Graphics, vol. 34, No. 4, Article 60, Aug. 2015, pp. 60:1 to 60:12.

Kovacs, Peter T. et al., "Overview of the Applicability of H.264/MVC for Real-Time Light-Field Applications", 2014 3DTV-Conference: The True Vision—Capture, Transmission and Display of 3D Video (3DTV-CON), IEEE, Jul. 2, 2014, 4 pp. total.

Masia, Belen et al., "Display Adaptive 3D Content Remapping", Computers and Graphics, vol. 37, No. 8, Dec. 1, 2013, pp. 983-996.

"3-D Display Technologies—New Trends of Space Expression", CMC Publishing Co., Ltd., Toshio Honda, Supervising Editor, Jul. 31, 2008, pp. 80-84.

Shimizu, Shinya et al., "View Scalable Multiview Video Coding Using 3-D Warping With Depth Map", IEEE Transactions on Circuits and Systems for Video Technology, vol. 17, No. 11, Nov. 2007, pp. 1485-1495.

"International Search Report and Written Opinion of the International Searching Authority dated Jul. 13, 2017; International Application No. PCT/US2017/030280", dated Jul. 13, 2017.

Aggoun, Amar et al., "Immersive 3D Holoscopic Video System", IEEE Multimedia Magazine, Special Issue on 3D Imaging Techniques and Multimedia Applications, vol. 20, No. 1, Jan.-Mar. 2013, pp. 28-37.

Akeley, Kurt et al., "A Stereo Display Prototype with Multiple Focal Distances", ACM Trans. Graph. (SIGGRAPH), vol. 23, 2004, pp. 804-813.

Alpaslan, Zahir Y. et al., "Development and Deployment of a Tiled Full Parallax Light Field Display System", Proceedings of the SPIE, Applications of Digital Image Processing XXXIX, vol. 9971, Sep. 27, 2016, pp. 99710J-1 to 99710J-8.

Alpaslan, Zahir Y. et al., "Parametric Characterization of Perceived Light Field Display Resolution", SID Symposium Digest of Technical Papers, vol. 47, No. 1, May 2016, pp. 1241-1245.

Alpaslan, Zahir Y. et al., "Small Form Factor Full Parallax Tiled Light Field Display", Proceedings of Electronic Imaging, SPIE-IS &T, vol. 9391, Feb. 9, 2015, pp. 93910E-1 to 93910E-10.

Arai, Jun et al., "Integral Three-Dimensional Television Using a 33-Megapixel Imaging System", Journal of Display Technology, vol. 6, No. 10, Oct. 2010, pp. 422-430.

Arai, Jun, "Three-Dimensional Television System Based on Spatial Imaging Method Using Integral Photography", International Conference on Acoustics, Speech, and Signal Processing (ICASSP) 2012, May 7-9, 2012, pp. 5449-5452.

Balogh, Tibor, "The HoloVizio System", Stereoscopic Displays and Virtual Reality Systems XIII, Proceedings of the SPIE-IS&T Electronic Imaging, vol. 6011, Jan. 27, 2006, pp. 60550U-1 to 60550U-12.

Bhaskaran, Vasudev, "65.1: Invited Paper: Image/Video Compression—A Display Centric Viewpoint", SID Symposium Digest of Technical Papers, vol. 38, No. 1, 2008, pp. 990-993.

Cakmakci, Ozan et al., "Head-Worn Displays: A Review", Journal of Display Technology, vol. 2, No. 3, Sep. 2006, pp. 199-216.

Candes, Emmanuel et al., "Near Optimal Signal Recovery From Random Projections: Universal Encoding Strategies?", 2004, pp. 1-39.

Candes, Emmanuel J. et al., "Robust Uncertainty Principles: Exact Signal Reconstruction From Highly Incomplete Frequency Information", IEEE Transactions on Information Theory, vol. 52, No. 2, Feb. 2006, pp. 489-509.

Chai, Jin-Xiang et al., "Plenoptic Sampling", Proceedings of the 27th Annual Conference on Computer Graphics and Interactive Techniques—SIGGRAPH '00, 2000, pp. 307-318.

Chen, Jianhong et al., "True Color Optical Simulation of Integral Imaging 3D Display", Proceedings of the International Display Workshops, vol. 21, Dec. 3, 2014, pp. 848-851.

Chen, Wei et al., "New Requirements of Subjective Video Quality Assessment Methodologies for 3DTV", Video Processing and Quality Metrics 2010 (VPQM), Scottsdale, United States, 2010, 6 pp. total.

(56) References Cited

OTHER PUBLICATIONS

Conti, Caroline et al., "Spatial Prediction Based on Self-Similarity Compensation for 3D Holoscopic Image and Video Coding", 2011 18th IEEE International Conference on Image Processing (ICIP), Sep. 11-14, 2011, pp. 961-964.

Curless, Brian et al., "A Volumetric Method for Building Complex Models from Range Images", Proceedings of the 23rd Annual Conference on Computer Graphics and Interactive Techniques, 1996, pp. 1-10.

Donoho, David L. , "Compressed Sensing", IEEE Transactions on Information Theory, vol. 52, No. 4, Apr. 2006, pp. 1289-1306.

El-Ghoroury, Hussein S. et al., "Quantum Photonic Imager (QPI): A New Display Technology and Its Applications", Proceedings of the International Display Workshops, vol. 21, Dec. 3, 2014, pp. 1202-1205.

El-Ghoroury, Hussein S. et al., "Quantum Photonic Imager (QPI): A Novel Display Technology that Enables more than 3D Applications", SID Symposium Digest of Technical Papers, vol. 46, No. 1, May 2015, pp. 371-374.

Fattal, David et al., "A multi-directional backlight for a wide-angle, glasses-free three-dimensional display", Nature, vol. 495, Mar. 21, 2013, pp. 348-351.

Fehn, Christoph , "A 3D-TV Approach Using Depth-Image-Based Rendering (DIBR)", Proceedings of Picture Coding Symposium, San Francisco, CA, USA, Dec. 2004, 6 pp. total.

Fehn, Christoph , "Depth-Image-Based Rendering (DIBR), Compression and Transmission for a New Approach on 3D-TV", Proc. of SPIE Stereoscopic Displays and Virtual Reality Systems XI, 2004, pp. 93-104.

Forman, Matthew C. et al., "Objective Quality Measurement of Integral 3D Images", Proc. SPIE 4660, Stereoscopic Displays and Virtual Reality Systems IX, 155, 2002, 8 pp. total.

Furihata, Hisayoshi et al., "Novel view synthesis with residual error feedback for FTV", Stereoscopic Displays and Applications XXI, Proceedings of the SPIE-IS&T Electronic Imaging, vol. 7542, Jan. 2010, pp. 75240K-1 to 75240K-12.

Gilliam, Christopher et al., "Adaptive Plenoptic Sampling", 2011 18th IEEE International Conference on Image Processing, 2011, pp. 2581-2584.

Gortler, Steven J. et al., "The Lumigraph", Proceedings of the 23rd Annual Conference on Computer Graphics and Interactive Techniques (SIGGRAPH '96), 1996, pp. 43-52.

Graziosi, Danillo B. et al., "Compression for Full-Parallax Light Field Displays", Proceedings of SPIE—The International Society for Optical Engineering, Feb. 2014, 14 pp. total.

Graziosi, Danillo B. et al., "Compression for Full-Parallax Light Field Displays", Stereoscopic Displays and Applications XXV, Proc. of SPIE-IS&T Electronic Imaging, vol. 9011, Mar. 6, 2014, pp. 90111A-1 to 90111A-14.

Graziosi, Danillo B. et al., "Depth assisted compression of full parallax light fields", Stereoscopic Displays and Applications XXVI, Proceedings of SPIE-IS&T Electronic Imaging, vol. 9391, Mar. 17, 2015, pp. 93910Y-1 to 93910Y-15.

Grossberg, Stephen et al., "Neural dynamics of saccadic and smooth pursuit eye movement coordination during visual tracking of unpredictably moving targets", Neural Networks, vol. 27, 2012, pp. 1-20.

Guenter, Brian et al., "Foveated 3D Graphics", ACM SIGGRAPH ASIA, Nov. 2012, 10 pp. total.

Halle, Michael W. et al., "Fast computer graphics rendering for full parallax spatial displays", Proc. SPIE 3011, Practical Holography XI and Holographic Materials III, Apr. 10, 1997, 8 pp. total.

Halle, Michael W. , "Multiple Viewpoint Rendering for Three-Dimensional Displays", PhD Thesis, Program in Media Arts and Sciences, School of Architecture and Planning, Massachusetts Institute of Technology, 1997, 164 pp. total.

Heide, Felix et al., "Adaptive Image Synthesis for Compressive Displays", Proc. of SIGGRAPH 2013 (ACM Transactions on Graphics), vol. 32, No. 4, 2013, 11 pp. total.

Hoffman, David M. et al., "Vergence-accommodation conflicts hinder visual performance and cause visual fatigue", Journal of Vision, vol. 8, No. 3, 2008, pp. 1-30.

Holliman, Nicolas S. et al., "Three-Dimensional Displays: A Review and Applications Analysis", IEEE Transactions on Broadcasting, vol. 57, No. 2, Jun. 2011, pp. 362-371.

Hoshino, H. et al., "Analysis of resolution limitation of integral photography", J. Opt. Soc. Am. A, vol. 15, No. 8, Aug. 1998, pp. 2059-2065.

Hu, Xinda et al., "Design and Assessment of a Depth-Fused Multi-Focal-Plane Display Prototype", Journal of Display Technology, vol. 10, No. 4, Apr. 2014, pp. 308-316.

Hua, Hong et al., "A 3D integral imaging optical see-through head-mounted display", Optics Express, vol. 22, No. 11, May 28, 2014, pp. 13484-13491.

International Organisation for, Standardisation, "Call for Proposals on 3D Video Coding Technology", ISO/IEC JTC1/SC29/WG11, MPEG2011/N12036, Geneva, Switzerland, Mar. 2011, 20 pp. total.

International Organisation for, Standardisation, "Use Cases and Requirements on Free-viewpoint Television (FTV)", ISO/IEC JTC1/SC29/WG11, MPEG2013/N14104, Geneva, Switzerland, Oct. 2013, 12 pp. total.

International Telecommunication, Union, "H.264, Series H: Audiovisual and MultiMedia Systems, Infrastructure of audiovisual services—Coding of moving video, Advanced video coding for generic audiovisual services", ISO/IEC 14496-10:2003, Coding of Audiovisual Objects—Part 10: Advanced Video Coding, ITU-T Recommendation H.264, Mar. 2005, 343 pp. total.

Isaksen, Aaron et al., "Dynamically Reparameterized Light Fields", Proceedings of the 27th Annual Conference on Computer Graphics and Interactive Techniques (SIGGRAPH '00), 2000, pp. 297-306.

Iwadate, Yuichi et al., "Generating Integral Image from 3D Object by Using Oblique Projection", 18th International Display Workshops 2011 (IDS '11), Dec. 7-9, 2011, pp. 269-272.

Iwasawa, Shoichiro et al., "REI: an automultiscopic projection display", Proceedings of 3DSA2013, Selected paper 1, 2013, pp. 1-4.

Jang, Jae-Young et al., "3D Image Correlator using Computational Integral Imaging Reconstruction Based on Modified Convolution Property of Periodic Functions", Journal of the Optical Society of Korea, vol. 18, No. 4, Aug. 2014, pp. 388-394.

Javidi, Bahram et al., "Three-Dimensional Holographic Image Sensing and Integral Imaging Display", Journal of Display Technology, vol. 1, No. 2, Dec. 2005, pp. 341-346.

Kim, Changil , "Scene Reconstruction from a Light Field", https://graphics.ethz.ch/~kimc/publications/changil-kim-ms-thesis-2010-compressed.pdf, 2010, 72 pp. total.

Koike, T. , "Theory, Design, and Application of 4-D Light Field Display", Ph.D. Dissertation, University of Tokyo, Mar. 23, 2009, 133 pp. total.

Kundu, Shinjini , "Light Field Compression Using Homography and 2D Warping", 2012 IEEE International Conference on Acoustics, Speech and Signal Processing (ICASSP), Mar. 25-30, 2012, pp. 1349-1352.

Lanman, Douglas et al., "Near-Eye Light Field Displays", ACM Transactions on Graphics (TOC), vol. 32, Issue 6, Article 220, Nov. 2013, 27 pp. total.

Lee, Cheon et al., "View Synthesis using Depth Map for 3D Video", Proceedings of 2009 APSIPA Annual Summit and conference, Sapporo, Japan, 2009, pp. 350-357.

Levoy, Marc et al., "Light Field Rendering", Computer Graphics, SIGGRAPH 96 Proceedings, 1996, pp. 31-42.

Lippmann, M. G. , "Epreuves reversibles. Photographies integrales. ", Comptes-Rendus Academie des Sciences, vol. 146, 1908, pp. 446-451.

Liu, Shujie et al., "New Depth Coding Techniques With Utilization of Corresponding Video", IEEE Transactions on Broadcasting, vol. 57, No. 2, Jun. 2011, pp. 551-561.

Lucente, M. , "Computational holograhic bandwidth compression", IBM Systems Journal, vol. 35, Nos. 3&4, 1996, pp. 349-365.

Lucente, Mark , "Diffraction-Specific Fringe Computation for Electro-Holography", Doctoral Thesis Dissertation, MIT Dept. of Electrical Engineering and Computer Science, Sep. 1994, 171 pp. total.

(56) References Cited

OTHER PUBLICATIONS

Lucente, Mark, "Holographic bandwidth compression using spatial subsampling", Optical Engineering, Special Section on Electronic Holography, Jun. 1996, pp. 1-25.

Lucente, Mark, "Interactive Computation of Holograms Using a Look-up Table", Journal of Electronic Imaging, vol. 2, No. 1, pp. 28-34, Jan. 1993, 14 pp. total.

Lucente, Mark, "Interactive holographic displays: the first 10 years", Book chapter for "Holography—The First 50 Years", Draft: 2003, 2003, 17 pp. total.

Lucente, Mark, "Interactive three-dimensional holographic displays: seeing the future in depth", for special issue of SIGGRAPH's Computer Graphics publication on Current, New, and Emerging Display Systems, May 1997, 17 pp. total.

Magnor, Marcus et al., "Data Compression for Light-Field Rendering", IEEE Transactions on Circuits and Systems for Video Technology, vol. 10, No. 3, Apr. 2000, pp. 338-343.

Maimone, Andrew et al., "Computational Augmented Reality Eyeglasses", 2013 IEEE International Symposium on Mixed and Augmented Reality (ISMAR), Oct. 1-4, 2013, pp. 29-38.

Maimone, Andrew et al., "Focus 3D: Compressive Accommodation Display", ACM Transactions on Graphics, vol. 32. No. 5, 2013, 13 pp. total.

Malvar, Henrique S. et al., "Lifting-based reversible color transformations for image compression", Proc. of SPIE of Applications of Digital Image Processing, vol. 7073, 2008, pp. 707301-1 to 707301-10.

Marwah, Kshitij et al., "Compressive Light Field Photography using Overcomplete Dictionaries and Optimized Projections", Proc. of SIGGRAPH 2013 (ACM Transactions on Graphics, 32, 4), 2013, 12 pp. total.

Masia, Belen et al., "A survey on computational displays: Pushing the boundaries of optics, computation, and perception", Computers & Graphics, vol. 37, 2013, pp. 1012-1038.

Matsubara, Rie et al., "Light field display simulation for light field quality assessment", Proceedings of the Stereoscopic Displays and Applications Conference XXVI (SPIE-IS&T), vol. 9391, Feb. 9-11, 2015, pp. 93910G-1 to 93910G-15.

Microsoft, "Microsoft HoloLens", downloaded from https://www.microsoft.com/en-us/hololens, admitted prior art, 5 pp. total.

Mori, Yuji et al., "View generation with 3D warping using depth information for FTV", Signal Processing: Image Communication, vol. 24, 2009, pp. 65-72.

Morvan, Yannick et al., "Platelet-based coding of depth maps for the transmission of multiview images", Proceedings of the SPIE, Stereoscopic Displays and Applications, vol. 6055, Feb. 2006, 12 pp. total.

Ng, Ren, "Fourier Slice Photography", ACM Trans. Graph., vol. 24, No. 3, Jul. 2005, pp. 735-744.

Oculus VR, LLC, "Oculus Gear VR", downloaded from https://www.oculus.com/gear-vr/, admitted prior art, 9 pp. total.

Oculus VR, LLC, "Oculus Rift", downloaded from https://www.oculus.com/rift/, admitted prior art, 15 pp. total.

Oh, Kwan-Jung et al., "Depth Reconstruction Filter and Down/Up Sampling for Depth Coding in 3-D Video", IEEE Signal Processing Letters, vol. 16, No. 9, Sep. 2009, pp. 747-750.

Oh, Kwan-Jung et al., "Hole-Filling Method Using Depth Based In-Painting for View Synthesis in Free Viewpoint Television (FTV) and 3D Video", Picture Coding Symposium (PCS) 2009, May 6-8, 2009, 4 pp. total.

Ohm, Jens-Rainer, "Overview of 3D Video Coding Standardization", Proceedings of the Three Dimensional Systems and Applications (3DSA) International Conference 2013, 2013, pp. 1-4.

Olsson, Roger et al., "A Combined Pre-Processing and H.264-Compression Scheme for 3D Integral Images", 2006 IEEE International Conference on Image Processing, 2006, pp. 513-516.

Olsson, Roger et al., "A Depth Dependent Quality Metric for Evaluation of Coded Integral Imaging Based 3D-Images", 3DTV Conference, 2007, 4 pp. total.

Park, Jae-Hyeung et al., "Recent progress in three-dimensional information processing based on integral imaging", Applied Optics, vol. 48, No. 34, Dec. 1, 2009, pp. H77-H94.

Piao, Yan et al., "Sub-sampling Elemental Images for Integral Imaging Compression", International Conference on Audio Language and Image Processing (ICALIP), 2010, pp. 1164-1168.

Razavi, R et al., "Low-delay video control in a personal area network for augmented reality", IET Image Processing, vol. 2, No. 3, 2008, pp. 150-162.

Reed, Nathan, "Depth Precision Visualized", retrieved online at https://developer.nvidia.com/content/depth-precision-visualized, Jul. 15, 2015, 11 pp. total.

Rolland, Jannick P. et al., "Dynamic focusing in head-mounted displays", Part of the IS&T/SPIE Conference on the Engineering Reality of Virtual Reality, SPIE vol. 3639, Jan. 1999, pp. 463-470.

Shi, Shasha et al., "Efficient Compression Method for Integral Images Using Multi-View Video Coding", 2011 18th IEEE International Conference on Image Processing, 2011, pp. 137-140.

Shum, Heung-Yeung et al., "Survey of Image-Based Representations and Compression Techniques", IEEE Transactions on Circuits and Systems for Video Technology, vol. 13, No. 11, Nov. 2003, pp. 1020-1037.

Sjostrom, Marten et al., "Improved Depth-Image-Based Rendering Algorithm", 3DTV Conference: The True Vision—Capture, Transmission and Display of 3D Video (3DTV-CON), 2011, 4 pp. total.

Sloan, Peter-Pike et al., "Time Critical Lumigraph Rendering", Proceedings of the 1997 ACM SIGGRAPH Symposium on Interactive 3D Graphics, 1997, 7 pp. total.

Smolic, Aljoscha et al., "Coding Algorithms for 3DTV—A Survey", IEEE Transactions on Circuits and Systems for Video Technology, vol. 17, No. 11, Nov. 2007, pp. 1606-1621.

Solh, Mashhour et al., "Depth Adaptive Hierarchical Hole-Filling for DIBR-Based 3D Videos", Proceedings of the SPIE, Three-Dimensional Image Processing (3DIP) and Applications II, vol. 8290, 2012, pp. 829004-1 to 829004-11.

Sullivan, Gary J. et al., "The H.264/AVC Advanced Video Coding Standard: Overview and Introduction to the Fidelity Range Extensions", SPIE Conference on Applications of Digital Imaging Processing XXVII, Special Session on Advances in the New Emerging Standard: H.264/AVC, Aug. 2004, pp. 1-21.

Sutherland, Ivan E., "A head-mounted three dimensional display", 1968 International Workshop on Managing Requirements Knowledge, 1968, pp. 757-564.

Takahashi, Keita, "Theoretical Analysis of View Interpolation With Inaccurate Depth Information", IEEE Transactions on Image Processing, vol. 21, No. 2, Feb. 2012, pp. 718-732.

Takaki, Yasuhiro, "High-Density Directional Display for Generating Natural Three-Dimensional Images", Proceedings of the IEEE, vol. 94, No. 3, Mar. 2006, pp. 654-663.

Tanimoto, Masayuki et al., "Reference Software of Depth Estimation and View Synthesis for FTV/3DV", International Organisation for Standardisation, ISO/IEC JTC1/SC29/WG11, MPEG2008/M15836, Busan, Korea, Oct. 2008, 5 pp. total.

Texas Instruments, "DLP Technology for Near Eye Display, Application Report", Literature No. DLPA051A, available online at http://www.ti.com/lit/wp/dlpa051a/dlpa051a.pdf, Sep. 2014, 18 pp. total.

Tian, Dong et al., "View Synthesis Techniques for 3D Video", Applications of Digital Image Processing XXXII, Proceedings of the SPIE, vol. 7443, 2009, pp. 74430T-1 to 74430T-11.

Urey, Hakan et al., "State of the Art in Stereoscopic and Autostereoscopic Displays", Proceedings of the IEEE, vol. 99, No. 4, Apr. 2011, pp. 540-555.

Vetro, Anthony et al., "Overview of the Stereo and Multiview Video Coding Extensions of the H.264/MPEG-4 AVC Standard", Proceedings of the IEEE, vol. 99, No. 4, Apr. 2011, pp. 626-642.

Walls, Frederick et al., "VESA Display Stream Compression", Downloaded at http://www.vesa.org/wp-content/uploads/2014/04/VESA_DSC-ETP200.pdf, Mar. 3, 2014, pp. 1-5.

Wang, Zhou et al., "Image Quality Assessment: From Error Visibility to Structural Similarity", IEEE Transactions on Image Processing, vol. 13, No. 4, Apr. 2004, pp. 600-612.

(56) References Cited

OTHER PUBLICATIONS

Wegner, Krzysztof et al., "Enhanced View Synthesis Reference Software (VSRS) for Free-viewpoint Television", International Organisation for Standardisation, ISO/IEC JTC1/SC29/WG11, MPEG2013/M31520, Geneva, Switzerland, Oct. 2013, 4 pp. total.
Wetzstein, Gordon et al., "Compressive Light Field Displays", IEEE Computer Graphics and Applications, vol. 32, Issue 5, Sep./Oct. 2012, pp. 6-11.
Wetzstein, Gordon et al., "Tensor Displays: Compressive Light Field Synthesis using Multilayer Displays with Directional Backlighting", 2012 Proceedings of ACM SIGGRAPH Transactions on Graphics (TOG), vol. 31, Issue 4, Article 80, Jul. 2012, 11 pp. total.
Wikipedia, "List of refractive indices", https://en.wikipedia.org/wiki/List_of_refractive_indices, Dec. 7, 2003, 5 pp. total.
X Company, "Glass", downloaded from http://www.google.com/glass/start/, which redirects to https://x.company/glass/, admitted prior art, 6 pp. total.
Yan, P. et al., "Integral image compression based on optical characteristic", IET Computer Vision, vol. 5, No. 3, 2011, pp. 164-168.
Yang, Lu et al., "Artifact reduction using reliability reasoning for image generation of FTV", Journal of Visual Communication and Image Representation, vol. 21, 2010, pp. 542-560.
Yang, Lu et al., "Error Suppression in View Synthesis Using Reliability Reasoning for FTV", 3DTV Conference: The True Vision—Capture, Transmission and Display of 3D Video (3DTV-CONO), Jun. 2010, 4 pp. total.
Yi, Faliu et al., "Fast 3D Computational Integral Imaging Using Graphics Processing Unit", Journal of Display Technology, vol. 8, No. 12, Dec. 2012, pp. 714-722.
Yi, Faliu et al., "Simultaneous reconstruction of multiple depth images without off-focus points in integral imaging using a graphics processing unit", Applied Optics, vol. 53, No. 13, May 1, 2014, pp. 2777-2786.
Yoo, Hoon , "Artifact analysis and image enhancement in three-dimensional computational integral imaging using smooth windowing technique", Optics Letters, vol. 36, No. 11, Jun. 1, 2011, pp. 2107-2109.
Zhang, Cha et al., "Compression of Lumigraph with Multiple Reference Frame (MRF) Prediction and Just-in-time Rendering", Proceeding of the 2000 Data Compression Conference, DCC 2000 Snowbird, UT, USA; Mar. 28-30, 2000, Los Alamitos, CA, USA; IEEE Comput. Soc., Mar. 28, 2000, pp. 253-262.
Zhao, Yin et al., "Boundary Artifact Reduction in View Synthesis of 3D Video: From Perspective of Texture-Depth Alignment", IEEE Transactions on Broadcasting, vol. 57, No. 2, Jun. 2011, pp. 510-522.
Zhao, Yin et al., "Suppressing Texture-Depth Misalignment for Boundary Noise Removal in View Synthesis", 28th Picture Coding Symposium, PSC2010, Nagoya, Japan, Dec. 8-10, 2010, pp. 30-33.
Li, Yun et al., "Coding of Plenoptic Images by Using a Sparse Set and Disparities", 2015 IEEE International Conference on Multimedia and Expo (ICME), Jun. 29, 2015, Jun. 29, 2015, pp. 1-6.

\* cited by examiner

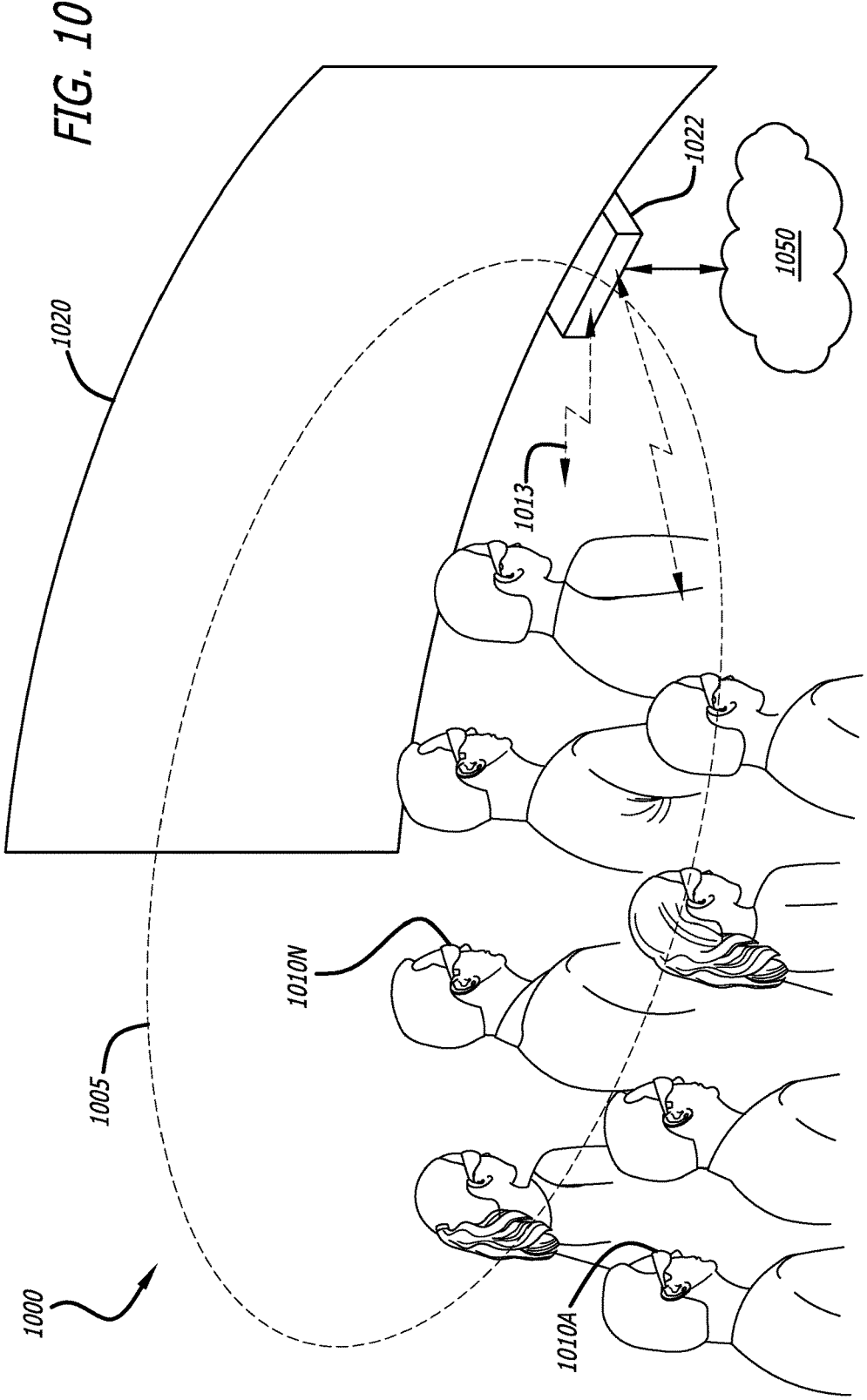

INTEGRATED NEAR-FAR LIGHT FIELD DISPLAY SYSTEMS

CROSS-REFERENCE TO RELATED APPLICATIONS

This application claims the benefit of U.S. Provisional Patent Application No. 62/329,111, filed Apr. 28, 2016, the entirety of which is incorporated herein by reference.

FIELD

One aspect of the present disclosure generally relates to near-eye displays, augmented reality displays, and light field display systems.

BACKGROUND

Light field displays that allow a viewer to focus at will on objects at various depths of a scene are poised to become more commonplace and have a wide number of commercial and consumer applications. For example, light field displays may be used in near-eye display and augmented reality applications, as well as in direct view applications enabling a multiplicity of viewers to focus on different or the same objects in a scene. Currently, it is often difficult for conventional light field display solutions to provide a uniformly high resolution viewing experience for viewing objects at various depths within the light field.

BRIEF DESCRIPTION OF THE DRAWINGS

The embodiments herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

In the drawings:

FIG. 10 illustrates an example for explaining an integrated light field display system in a cinematic entertainment environment according to an embodiment.

DETAILED DESCRIPTION

Figure 1:
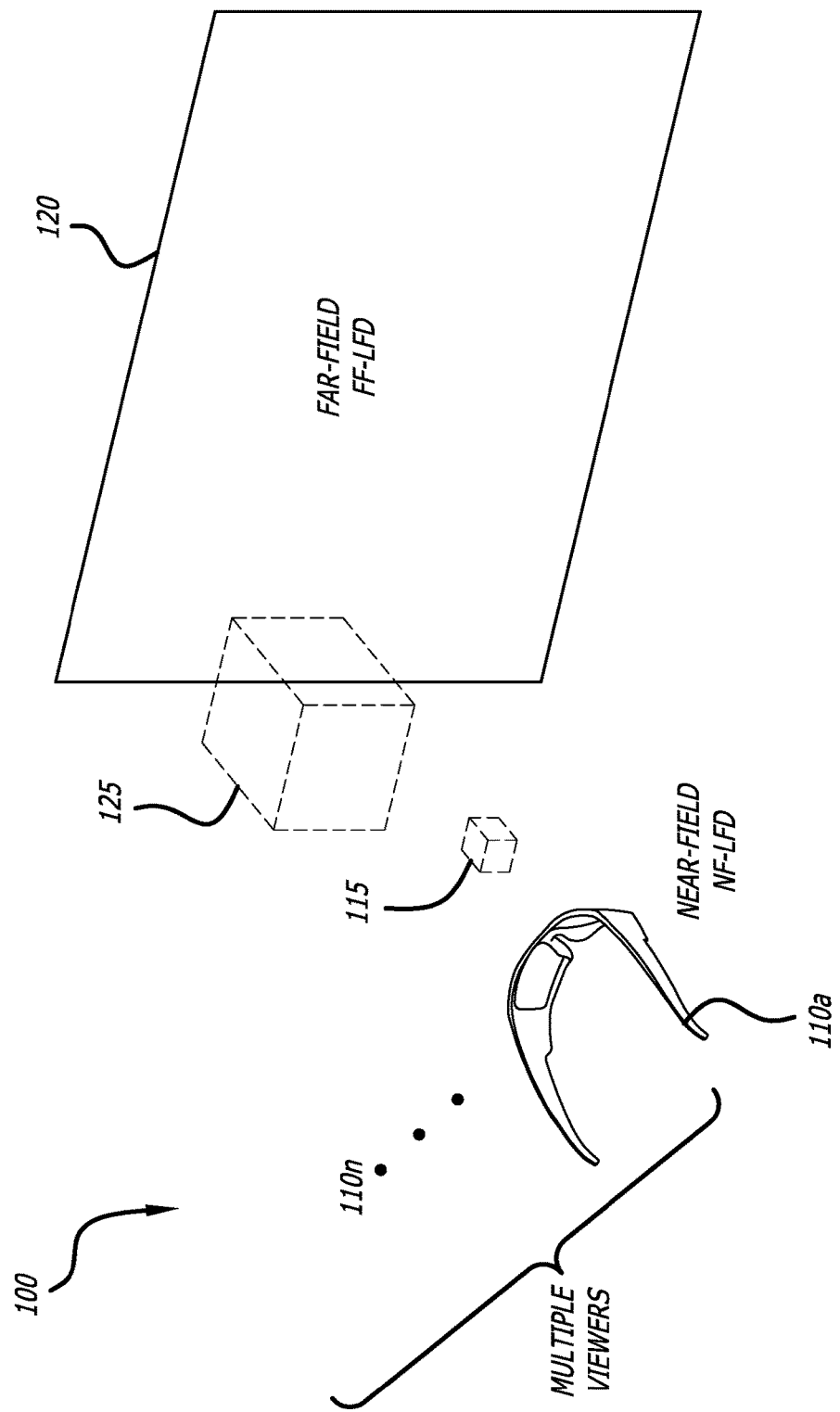
FIG. 1 illustrates an example for explaining an integrated light field display system for display of near and far segments of a light field according to an embodiment.

The present disclosure and various of its embodiments are set forth in the following description of the embodiments which are presented as illustrated examples of the disclosure in the subsequent claims. It is expressly noted that the disclosure as defined by such claims may be broader than the illustrated embodiments described below. The word "exemplary" is used herein to mean serving as an example, instance, or illustration. Any aspect or design described herein as "exemplary" is not necessarily to be construed as preferred or advantageous over other aspects or designs.

In one aspect of the disclosure herein, near-eye light field augmented reality light field displays are integrated with direct view light field displays to provide a viewer with an improved visual experience. With respect to light field displays, a new class of emissive micro-scale pixel array imager devices has been introduced as disclosed in U.S. Pat. Nos. 7,623,560, 7,767,479, 7,829,902, 8,049,231, 8,243,770, 8,567,960, and 8,098,265, the contents of each of which is fully incorporated herein by reference. The disclosed light emitting structures and devices referred to herein may be based on the Quantum Photonic Imager or "QPI®" imager. QPI® is a registered trademark of Ostendo Technologies, Inc. These disclosed devices desirably feature high brightness, very fast multi-color light intensity and spatial modulation capabilities, all in a very small single device size that includes all necessary image processing drive circuitry. The solid-state light-(SSL) emitting pixels of the disclosed devices may be either a light emitting diode (LED) or laser diode (LD), or both, whose on-off state is controlled by drive circuitry contained within a CMOS chip (or device) upon which the emissive micro-scale pixel array of the imager is bonded and electronically coupled. The size of the pixels comprising the disclosed emissive arrays of such imager devices is typically in the range of approximately 5-20 microns with a typical emissive surface area being in the range of approximately 15-150 square millimeters. The pixels within the above emissive micro-scale pixel array devices are individually addressable spatially, chromatically and temporally, typically through the drive circuitry of its CMOS chip. The brightness of the light generated by such imager devices can reach multiple 100,000 $cd/m^2$ at reasonably low power consumption.

The QPI imager is well-suited for use in the light field displays, both for near-eye augmented reality as well as direct view light field displays, described herein. See U.S. Pat. Nos. 7,623,560, 7,767,479, 7,829,902, 8,049,231, 8,243,770, 8,567,960, and 8,098,265. However, it is to be understood that the QPI imagers are merely examples of the types of devices that may be used in the present disclosure, which devices may, by way of a non-limiting set of examples, include OLED, LED, micro-LED imaging devices. Thus, in the disclosure herein, references to the QPI imager, display, display device or imager are to be understood to be for purposes of specificity in the embodiments disclosed, and not for any limitation of the present disclosure.

Figure 5:
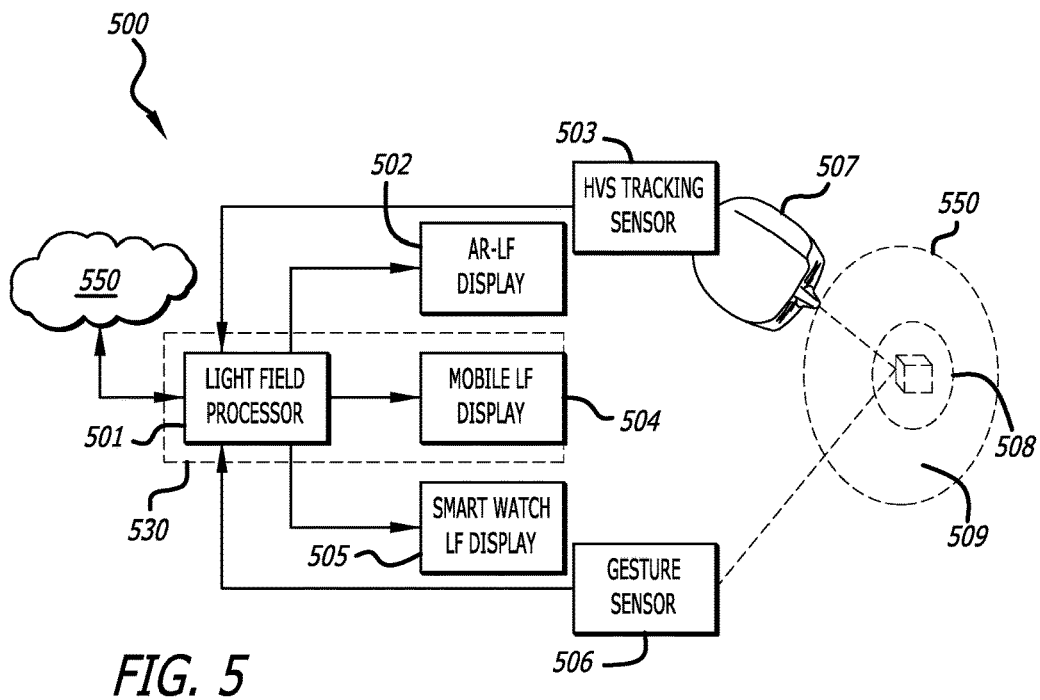
FIG. 5 illustrates an example block diagram for explaining the integrated light field display system of the embodiment of FIG. 3.

Turning to FIG. 1, FIG. 1 illustrates one example of an integrated light field display system comprising multiple light field display elements that collectively collaborate to display near and far segments of a light field. In particular, FIG. 1 illustrates a first example in which an integrated light field display system 100 includes a direct view light field display 120 modulating a far segment of a light field (LF) and a multiplicity of near-eye light field displays 110 (individually near-eye light field displays 110a-110n) displaying the light field segments near to each viewer. In one embodiment, the near-eye light field display (LFD) components 110 may each operate as an augmented reality light field display (AR LFD) that may comprise a set of optical see-through (OST) glasses. In one embodiment, the optical see-through glasses may include both eye and head tracking capabilities and may be able to obtain information regarding a viewer's eye gaze direction, interpupillary distance (IPD) and head orientation. For example, the optical see-through glasses may comprise at least one eye-tracking sensor per eye to detect multiple parameters of the viewer's eyes including but not limited to the angular position (or look angle) of each eye, the iris diameter, and the distance between the two pupils (IPD). As one example, the eye-tracking sensors may be a pair of miniature cameras each positioned to image one eye. In one embodiment, the eye-tracking sensors may be placed in a non-obstructive position relative to the eyes' field of view (FOV) such as the bridge section of the frame of the glasses. The eye-head tracking component may be configured to detect, track and predict where the viewer's head is positioned and where the viewer is focused in depth and direction within the collective light field volume. One example of a head and eye tracking system is shown in FIG. 5, as HVS tracking sensor 503.

The multiple AR LFD elements 110 may be interconnected together via a wireless local area network (W-LAN) or wireless personal area network (W-PAN) and may also be connected to the internet to enable streaming of light field content to be displayed in their collective light field volume. Another component of the integrated light field display system 100 is a light field processor (LFP) that is communicatively coupled, either wirelessly or via wire, to the other components of the integrated light field display system 100 including the multiplicity of AR LFD elements 110. In one embodiment, the light field processor may also be connected to a memory block that can be implemented via one or more memory devices including volatile storage (or memory) devices such as random access memory (RAM), dynamic RAM (DRAM), synchronous DRAM (SDRAM), static RAM (SRAM), or other types of storage devices. The light field processor may be implemented in software, hardware, or a combination thereof. For example, the light field processor can be implemented as software installed and stored in a persistent storage device, which can be loaded and executed in a memory by a processor to carry out the processes or operations described throughout this application. The light field processor may represent a single processor or multiple processors with a single processor core or multiple processor cores included therein. The light field processor may represent a microprocessor, a central processing unit (CPU), graphic processing unit (GPU), or the like. The light field processor may be a complex instruction set computing (CISC) microprocessor, reduced instruction set computing (RISC) microprocessor, matched instruction set microprocessor (MISP), very long instruction word (VLIW) microprocessor, or processor implementing other instruction sets, or processors implementing a combination of instruction sets. The light field processor can also be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. The light field processor may be a cellular or baseband processor, a network processor, a graphics processor, a communications processor, a cryptographic processor, an embedded processor, or any other type of logic capable of processing instructions. Furthermore, the light field processor can be implemented as specific hardware logic in a processor or processor core as part of an instruction set accessible by a software component via one or more specific instructions.

In one embodiment herein, the light field processor is cognizant of the position of each display element and computes the light field contribution 115 of each display element to the collective light field volume. In one embodiment, the light field processor visually articulates the appropriate portion of the integrated light field based on the viewers' visual and/or gesture cues to modulate that light field segment at the highest possible optical performance. Each of the AR LFD components 110 may include a wearable gesture sensor to enable the viewer to interface and interact with the light field. Each of the AR LFD components 110 may alternatively include a gesture tracking sensor incorporated within AR LFD 110 assembly to enable the viewer to interface and interact with the light field and the AR LFD. Each of the AR LFD components 110 may incorporate optical and display elements that enable optical see-through (OST) high fidelity performance to provide high quality visual performance of the light field displayed by the AR LFD as well as the (complementary) light field that is being displayed by a far-field (FF) LFD display 120. The AR LFD provides viewer focus-ability of near-field objects at a high-resolution level and incorporates light field compression and visual decompression techniques that enable a lightweight and low power system. The AR LFD disclosed herein may include both visual and location sensors, such as an inertial measurement unit (IMU) for example, that "localize" the viewer within the total light field volume of the system.

In one embodiment, the AR LFD components 110 of the system may also include a simultaneous localization and mapping (SLAM) capability to assist in locating the viewer within the display light field volume more accurately and in real-time.

In one embodiment, the AR LFD components 110 of the system may have an angular resolution that approaches human vision system acuity limits and make it possible to give the viewer as close as possible, a real-world viewing experience of the near light field.

The far-field (FF) portion of the light field of the system 100 may be configured to be displayed or modulated by the direct view light field display component (FF LFD) 120 of the system incorporating sufficient light field modulation capabilities to permit the display of the light field to viewers within a large viewing distance (light field depth) ranging from about 1 m to 10 m viewing distance as the background light field yet remain focusable by the viewer's optical see-through (OST) AR LFD as the ambient reality being augmented by the AR LFD component 110 of the system. The integrated light field display system 100 may decide whether the far field LFD (e.g. FF LFD 120) or the near field LFD (e.g. AR LFD, also referred to herein as an NF LFD) 110 provides the best viewing experience to the viewer. In order to make that decision, the integrated light field display system 100, and in particular the light field processor, may compute one or a predetermined set of optical performance light field characteristics such as resolution or a spatial or angular modulation transfer function (MTF) as a performance metric of each of the light fields being modulated by both components of the system where the viewer is focused and the light field data may be routed to the LFD components. The MTF may consider the spatial or angular frequency response of the light field display, and may also consider both the spatial and angular frequency response of the light field display). The integrated light field display system 100 may command one or more of the LFD components (e.g., NF LFD 110 and FF LFD 120) having the best MTF performance to modulate (or display) the segment of the light field being focused upon by the viewer. For example, if the viewer is focused on a FF object 125, the computed MTF where the viewer is focused would be highest when that LF portion surrounding the object 125 is modulated by the FF LFD 120 and the integrated LFD system 100 may route the data pertaining to that portion of interest of the light to be modulated to the viewer via the FF LFD component 120. Similarly, if the viewer is focused on a NF object 115, the computed MTF where the viewer is focused would be highest when that LF portion surrounding the object 115 is modulated by the NF LFD 110 and the integrated LFD system 100 may route the data pertaining to that portion of interest of the light to be modulated to the viewer via the NF LFD component 110. In both cases, while the selected light field display modulates the portion of the light field where the viewer is focused at the highest optical performance (e.g., MTF) possible, the complementary light field display modulates the rest of the light field as a background ready to be focused upon (or focusable) by the integrated LFD system viewer. The integrated LFD systems and methods described herein therefore provide the system user with the highest possible optical performance in viewing an integrated (or extended) light field volume covering the complementary LF volumes of its constituent LFD components. The integrated LFD system's action in providing the highest possible optical performance, and therefore the best possible viewing experience, are viewer-driven very much in a similar way as the viewers naturally focus on their surroundings.

With this approach, the overall system performance (3D focusable viewability) is shared (divided) and provided by the near field (NF) and far field (FF) LFD components of the system. Viewable light field depth (volume) in particular can be substantially large while maintaining a high fidelity viewing experience of both near and far objects within the integrated display system light field volume. Since the AR LFD component 110 is near the viewer's eye and is capable of obtaining the viewer's eye gaze direction, interpupillary distance (IPD) and head orientation, near field objects can be displayed to each one of multiple viewers simultaneously at tractable computational loads given the light field segmentation possible by the distributed aspects of the system.

With the distributed aspects of the integrated NF LFD system disclosed herein, as many as 8-16 views AR LFD and 128-256 views FF LFD components, for example, can be used to provide an experience far exceeding that of 4096 views of a direct view LFD yet with each component being computationally feasible (tractable) by virtue of the distributed computation aspect of the integrated LFD system disclosed herein. It is therefore possible for the near field (NF) and far field (FF) components of the integrated LFD system to computationally complement each other to provide a superior viewing performance experience for the viewer.

In addition, with the distributed optical aspects of the integrated LFD system disclosed herein, it is possible to have the FF LFD operate at a lower resolution (which enables more views at a wider field of view (FOV) coverage) while the AR LFD component, by virtue of its eye/head tracking capability, provides complementary fine resolution to fill in the coarse light resolution provided by the FF LFD component. It is therefore possible for the near field (NF) and far field (FF) components of the integrated LFD system to optically complement each other in terms of viewing performance experienced by the viewer.

In leveraging the viewer's localization capabilities of the integrated LFD system disclosed herein, it is possible to dynamically adjust the number of views being modulated by the FF LFD to match the number and location of the viewers engaging the system, thus introducing power consumption and compression benefits. The system can track and accommodate multiple viewers simultaneously.

Figure 2A:
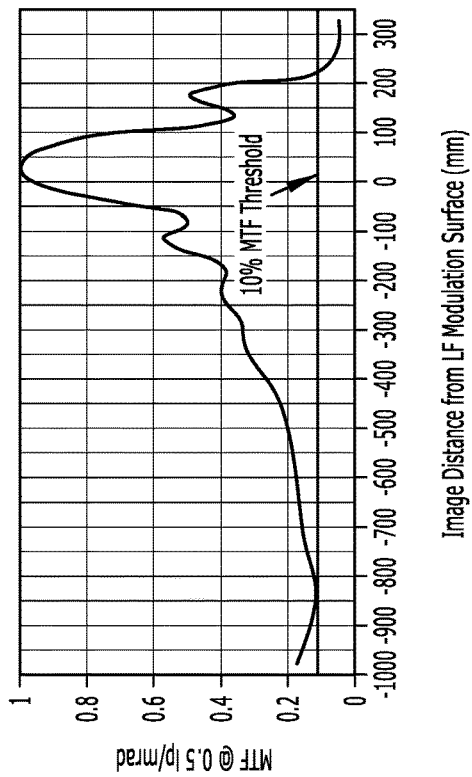
FIGS. 2A to 2C illustrate examples for explaining an optical modulation transfer function (MTF) of a light field display according to an embodiment.
Figure 2B:
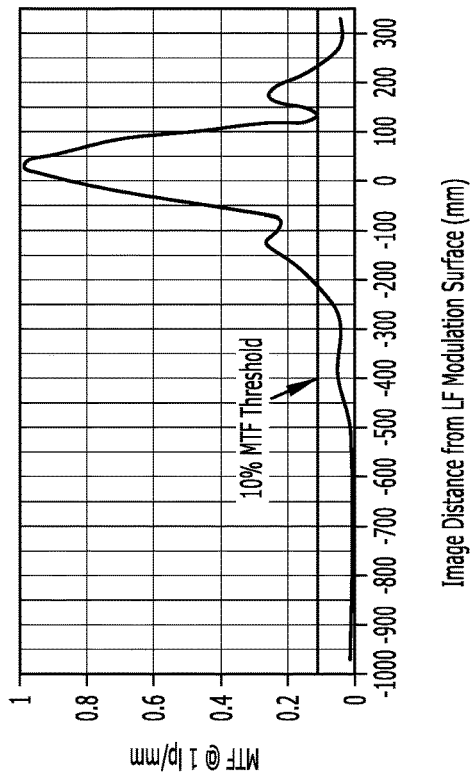

FIGS. 2A and 2B illustrate the optical modulation transfer function (MTF) performance of an exemplary light field display. FIGS. 2A and 2B illustrate the light field display MTF performance metric expressed spatially and angularly; respectively, relative to the distance of the viewer's focus point from the light field modulation surface. In FIGS. 2A and 2B, the positive axis indicates the viewer's focus point being within the front region of the light field modulation surface while the negative axis indicates the viewer's focus point being within the back region of the light field modulation surface. As illustrated, the optical MTF of the displayed light field is typically at its highest value in the vicinity (e.g., front and back regions) of the light field modulation surface and decreases systematically for regions of the modulated light field farther away from the light field modulation surface. The trend illustrated in these FIGS. 2A and 2B, which show strong dependence of the light field MTF performance on the distance from the modulation surface, is used to determine the ultimate useful volume of the modulated light field. For direct view light field displays, the trend limits the viewer's near-field MTF. For near-eye light field displays, the trend limits the viewer's far-field MTF.

In terms of performance, a direct view LFD may struggle to achieve an acceptable optical modulation transfer function (MTF) further away from the display surface. A near-eye LFD may also have a good MTF for viewing objects near the viewer's eye but may struggle to achieve an acceptable MTF for objects far away from the viewer's eye. In both cases, a compromise design that aims to achieve higher MTF away from the modulation surface may compromise the 3D viewing resolution or granularity of the viewed objects. With the integrated near field/far field light field displays described herein, each component of the system is used at its performance "sweet spot". When the viewer focuses on a nearby object, the system handles the modulation of the LF within the volume surrounding that viewable object using or through the viewer's AR LFD thus presenting the viewer the best achievable optical transfer function (OTF) performance or MTF of that object. At the same time, the system uses the FF LFD to modulate the rest of the light field viewed by the viewer and to possibly coarsely (e.g., blurred details) modulate the light field background which remains viewable through the OST capabilities provided by the AR LFD component of the system. On the other hand, if the viewer focuses on an object far away from the viewer's eye, for example near or behind the FF LFD modulation surface, then the system provides enough views or perspectives that allow the viewer's eye to accommodate through the OST capabilities of their AR LFD while achieving high MTF since the viewed object is now in the performance "sweet spot" of the FF LFD.

Figure 2C:
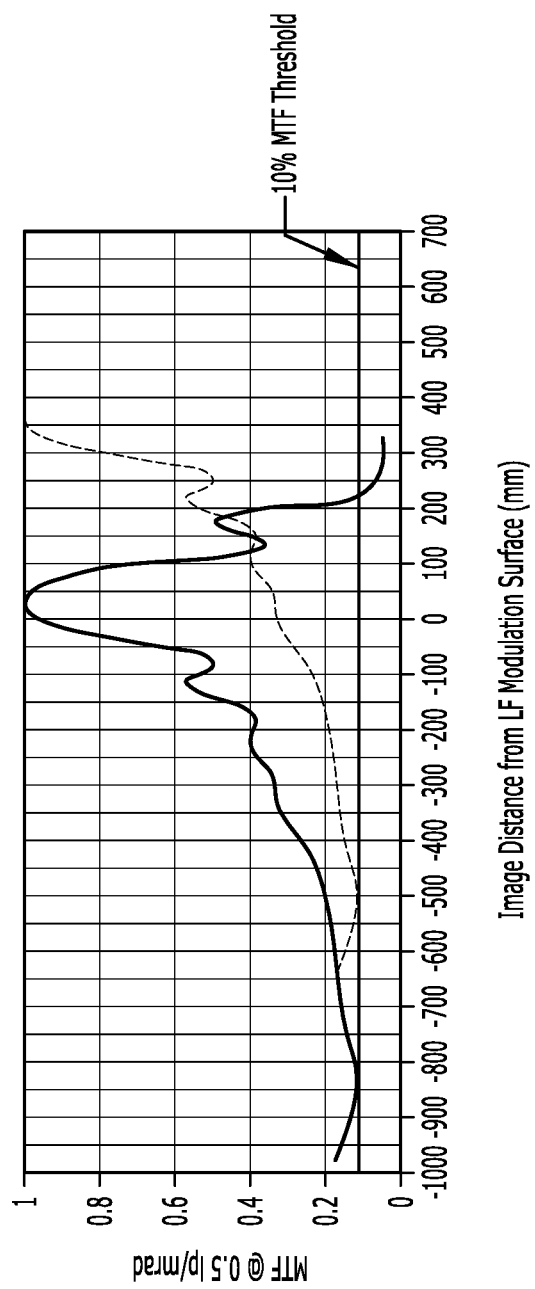

It is important to note from FIGS. 2A and 2B that a specified MTF limit value, for example MTF>10% as indicated by the MTF lines in FIGS. 2A and 2B, defines a larger light field volume when the MTF is expressed angularly rather than spatially. Since the human visual system (HVS) depth perception is intrinsically angular, expressing the MTF metric of the integrated light field display disclosed herein angularly is more meaningful in terms of indicating HVS perceptional limits. FIG. 2C illustrates the MTF performance of the integrated light field display according to an embodiment herein with an AR LFD component (dotted line) located approximately 30 cm from the direct view LFD component (solid line). It should be noted that the light field modulation surface for the AR LFD component is the eye-box of the display while for the direct-view LFD component it is its display surface. As can be seen from FIG. 2C, the integrated light field display in this embodiment achieves 0.5 lp/mrad MTF>50% across a light field volume extending more than 50 cm from the AR LFD component eye-box with that light field volume extending to almost 100 cm with 0.5 lp/mrad MTF>10%. The cooperative light field modulation aspect of the integrated light field display is readily demonstrated in FIG. 2C which illustrates how the AR LFD and direct-view LFD components of the integrated light field display complement each other from the near to the far depth of the light field volume while achieving higher MTF performance over a more extended volume than what can be achieved by either of the system's LFD components.

Angular Partition:

In one embodiment, to implement the cooperative light field modulation scheme disclosed herein, the FF LFD modulates the light field with large angular resolution leaving the finer angular resolution to be "filled in" by the AR LFD. In this manner, the modulation pixels of the FF LFD can be beneficially dedicated to increasing the field of view (FOV) rather than the number of views. In this embodiment, the entire light field volume is coarsely (at a low angular resolution) modulated by the FF LFD and, when the viewer focus depth or vergence is detected by the AR LFD eye/head tracking sensor, the object is brought into fine angular resolution that is achieved by the LF modulation capabilities of the AR LFD component of the system.

Volumetric Partition:

In one embodiment, to implement the cooperative light field modulation scheme disclosed herein, the overall light field volume is partitioned into a far-field segment which is modulated by the direct view FF LFD component and a multiplicity of near-field segments, each possibly centered around one of the system viewers. As any of the viewers focus on a far-field object, they would be focusing on what is being displayed or modulated by the FF LFD component of the system. As one of the viewers focuses on a near-field object, that object would be modulated by that view AR LFD component of the system associated with that viewer. In this embodiment, the entire light field is partitioned volumetrically rather than the angularly as in the aforementioned embodiment. In both cases, what is being viewed or perceived by the viewer is the result of the combined light field modulated by both components of the integrated LFD system.

An advantage of the disclosed LFD system is its distributed light field modulation aspects; both optically and computationally. Besides the significant optical performance that it achieves (see preceding discussion of FIG. 2C), this feature significantly alleviates the high processing throughput and memory requirements typical of LFD systems at that level of performance. In addition, the disclosed integrated LFD system enables a built-in light field compression within its distributed processing and LF modulation architecture. This becomes clear in that a direct view LFD must, by definition, enable a multiplicity of views within its LF modulation volume to be focused upon simultaneously by a multiplicity of viewers who may be focused on different or the same objects within the LFD volume from different perspectives (directions). Because of this fundamental requirement, the LFD volume must be able to provide the specified performance requirement in terms of MTF and viewing resolution uniformly across the entire light field display volume which, besides being a daunting task on its own in terms of optical and light field modulation design aspects, it is also daunting in terms of required processing and memory resources, especially given the performance expectations set forth by current 2D displays.

This challenge is dealt with in the integrated LFD system design disclosed herein by the segmentation of the light field, either volumetrically or angularly, and introduces a further major compression benefit in that the decompression and possibly rendering aspects are also segmented with the final decompression stage that leads to the high fidelity viewing experience being performed based on viewers' access demands of the light field. This replicates the architecture of the human visual system (HVS) in which the finer resources of the system; namely, the approximately two (2) degree aperture of the central fovea part of the retina, is leveraged toward achieving the highest possible resolution for the focus part of the view while the low resolution remainder part of the retina is used to provide sufficient cognitive awareness of the view peripheral background.

The disclosed distributed LFD architecture follows similar strategy and extends the HVS eye pupil saccade approach in that it enables the user's saccade and focus action to derive the integrated LFD similar to how it derives the human cognitive perception capabilities, which is the processing-intensive portion of human reality perception interface. The disclosed distributed LFD architecture allows the system viewers to interact visually with the integrated light field volume of the system similar to the way viewers would typically focus on objects in their ambient surroundings; the light field modulation and processing being handled cooperatively by the distributed components of the LFD system disclosed herein. In addition, the LFD system disclosed herein brings into high resolution viewability of the multiple portions of the light field that the system viewers are visually interacting with or focused upon. When the LFD system is being viewed by a single viewer, this approach is able to realize high levels of light field viewing performance using substantially fewer processing resources. When the LFD system is being viewed by multiple viewers, with this approach the processing resources needed to realize the high light field viewing performance scale up proportionally, but still in a distributed fashion.

That is to say in the LFD system disclosed herein, the processing-intensive resources of the system are geared or aligned with what the system viewers are attempting to acquire from the system—the system resources may then be used to enhance or provide a higher level of viewing experience to serve what the viewers seek rather than make a broader range of lower performance viewing potentials that consume system resources when such synthesized views may never be seen or perceived by any of the system's viewers.

This distributed LFD approach enables bringing high fidelity 3D display capabilities to mobile devices such as smart phones and tablets. The challenge here is obvious as the demands themselves are pronounced. The need for increased mobile visual bandwidth is widely recognized for keeping and sustaining business growth of mobile digital media providers.

To enable such capabilities, near-eye virtual reality (VR) and augmented reality (AR) displays are being explored as a platform. These platforms are sought in part because: 1) a direct-view LFD on a mobile device is not supportable using today's available display technologies; and, 2) assuming such technology eventually exists, it may not enable the reality augmentation aspects made possible by near-eye displays. The embodiments disclosed herein recognize that a higher performance near-eye display is rather challenging and that there is a risk that an underwhelming performance of such displays will put a damper on this aspect of growth of the mobile digital media industry.

The distributed LFD system described herein addresses these challenges and does so in conjunction with existing state of the art display technologies. As such, it is possible to enable high performance 3D capabilities in the mobile user environment that augment the display of the mobile device. It is also possible to make use of a direct-view display of the mobile device by making it work cooperatively with a mobile AR display, with the two components together used to implement a distributed LFD that enables high performance 3D viewing by mobile users, such that commercial growth potential is unleashed. The integrated light field display system of the embodiments herein may be realized by the direct view LFD of the mobile device working cooperatively with an AR display, each augmenting and complementing the other. The user may enjoy the best of both capabilities at a high performance, 1) the augmented reality with the background being the far-field, and 2) the mobile device itself being or synthesizing the far-field.

In addition, the disclosed LFD system can be implemented in a mobile shared viewing scenario with only the 3D display of the mobile device offering a limited FOV to cope with the excessive processing need of a large FOV, but with the light field content to be shared being viewable by a co-viewer connected to the LFD system described herein and the LFD volume being extended to enable sharing of the light field contents. As such, sharing the light field content of one viewer (the primary viewer) would be as simple as the co-viewer becoming connected to the LFD system to make his or her AR LFD become integrated with the primary viewer LFD system viewing volume and then visually interacting with (e.g., focusing on) the light field content to be shared.

The same is the case for tablets, laptop and desktop computers—the distributed LFD disclosed herein makes a high performance 3D experience possible on those platforms as well.

The same is also the case for cinematic viewing, gaming, command and control centers or commercial venue displays. In one embodiment, information from mobile users' AR displays is acquired by a large venue light field display to allow users wearing their AR display to experience a super-augmented reality as they walk by or sit in front of the large venue light field display, for example in a movie theatre.

Figure 3:
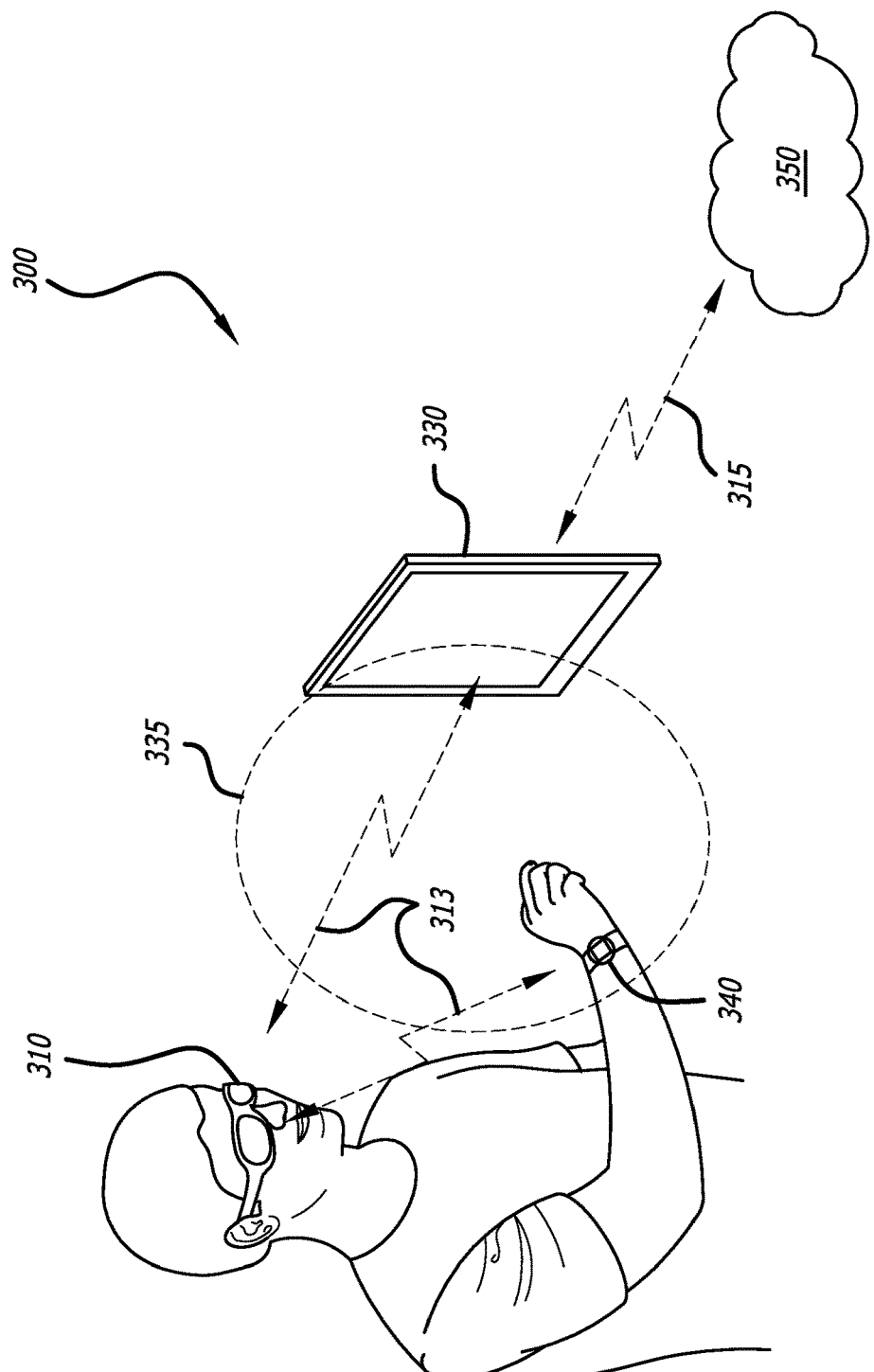
FIG. 3 illustrates an example for explaining an integrated light field display system in a mobile environment according to an embodiment.

Integrated Mobile LF Display:

FIG. 3 illustrates an embodiment of the integrated light field display system in a mobile scenario. In this embodiment, an integrated near/far light field display system 300 may comprise three display components, as illustrated in FIG. 3:

1. A near-eye augmented reality (AR) display 310, such as a light field display or a device capable of displaying focusable three dimensional (3D) viewing contents;
2. A mobile light field display 330 (e.g., mobile device or phone); and
3. A wearable light field display 340 (e.g., smart watch).

All three LFD components of the system may be interconnected wirelessly (WL) using a personal area network (PAN) protocol together with a gesture sensing device integrated on the smart watch to add gesture control capability with the displayed light field volume.

The near-eye augmented reality (AR) light field display 310 may be worn by a mobile user on or near the user's head. The mobile light field display 330 may be a direct view light field display that is an integral part of a user's mobile smartphone or tablet device. The wearable light field display 340 may be an integral part of wrist worn device (e.g., smart watch). AR LFD 310 may incorporate a head and eye tracking sensor and interface capabilities. Wearable LFD 340 may incorporate a gesture sensor and interface capabilities. The three light field display elements and the two sensor elements may be interconnected via a wireless personal area network (WPAN) using interface capabilities incorporated as an integral part of each element. In order to reduce the light field processing throughput and memory requirements, and subsequently the power consumption requirements of the AR LFD 310 and wearable LFD 340, the light field processor (LFP) of the integrated light field system may be collocated together with the mobile light field display 330 within the mobile device or phone. Using the communication interface capabilities of its host mobile device or phone, the light field processor (LFP) may also be connected to the internet or cloud 350 via either a mobile wireless network or a wireless local area network (WLAN) 315, in order to further reduce the overall integrated light field display system processing throughput and memory requirements and power consumption requirements by leveraging cloud computing performed possibly by the cloud server of the light field content provider. Based on position and orientation information sent by the three light field display elements through their wireless interconnects, which may be extracted from each mobile device's embedded position and orientation sensor, the light field processor (LFP) may compute the position and orientation of each of the three light field display elements relative to the light field volume 335 viewable by the mobile user. Through the integrated light field display system interconnectivity, the light field processor (LFP) obtains the position of each of the three display elements, computes the light field contribution of each of the display elements to the collective light field volume 335, and visually articulates the appropriate portion of the collective light field volume 335 based on the viewers' visual and/or gesture cues to modulate the respective light field segment at the highest possible optical performance.

Still referring to FIG. 3, the three LFD components are interconnected wirelessly through a wireless PAN 313. The overall LFD system 300, including the three components, works as a single integrated LFD system. For example, LF content may be streamed from the internet 350 via the interface 315 then processed by a LF processor (LFP) which may be collocated with or as a part of the mobile device 330 to determine the portion of the LF in focus by the viewer and whether it should display it using near-field by the AR LFD component 310 or far-field by the mobile LFD component 330. This can be guided by input provided by a eye-head tracking component of the AR LFD 310 which may be configured to detect, track and predict where the viewer is focused in depth and direction. Once such information is provided to the LFP, it fetches the commensurate LF data segment (if it does not already have it in it local memory) through IP queries to the content server through the cloud. Also, as the LF data segment to be displayed is determined (in location within the mobile LF volume 335), the LFP decides whether that LF segment is near- or far-field and accordingly routes the LF data segment to be displayed to either the AR LFD component 310 (if it is a near-field LF segment) or to the mobile LFD component 330 (if it is a far field LF segment). In both cases, both display components may receive the entire background LF content, in abbreviated format (e.g., lower resolution), to display simultaneously with the viewer in-focus LF segment. The light field display responsible for displaying the viewer in-focus or of-interest LF segment modulates the fully articulated LF content (e.g., fully articulated LF segment 508 shown in FIG. 5) within that LF segment and the other LF components are configured to be displayed as an abbreviated LF background (e.g., abbreviated LF segment 509 shown in FIG. 5) that supports the viewer gaze search. In one embodiment, any of the three LFD components shown in FIG. 3 are able to display the fully articulated LF viewer in-focus segment including the smart watch display 340.

The viewer may interact with the displayed LF volume 335 in one of at least two ways: 1) Visual Interaction—Interface Using Eye; and 2) Gesture Interaction—Interface Using Hand.

1. Visual Interaction—Interface Using Eye

With respect to visual interaction, a viewer may scan (or saccade) through the LF volume quickly and the integrated light field display system detects and decides what segment to focus on (similar to the way a viewer does naturally). As soon as the viewer is focused, that LF segment is fully articulated regardless of where it is in the LF volume. A fully articulated LF means a high resolution LF is displayed within the viewer's HVS depth of focus with high resolution adapted to where the in-focus LF segment is located within the LF volume. This means the integrated LF display is able to display high resolution that closely or substantially matches the HVS anywhere within the LF volume. This is a significant advantage because typically in LF displays, resolution degrades the farther the viewer depth of field focus is from the LF modulation surface (see FIGS. 2A and 2B). This capability is made possible because of the distributed nature of the multiple LF display components system which allows the LF display components nearest the viewer's in-focus segment to modulate that LF segment at the highest resolution possible given its closer vicinity to the in-focus segment (see FIG. 2C).

2. Gesture Interaction—Interface Using Hand

The viewer can also interact with the distributed LF volume using his or her hand via a gesture sensor or other suitable gesture sensing device. Augmenting the gesture sensor, which may detect the movement of the hand, palm, thumb and fingers, is a position sensor (micro gyro/accelerometer) that allows the smartwatch within which a gesture sensor may be integrated, to sense the position of the viewer's hand within the LF volume. Together, the hand gesture sensor and the hand position sensor allow/enable the viewer to position his or her hand wherever they want within the distributed LF volume, then issue gesture commands using the hand, wrist, thumb and fingers to interact with objects they view within the LF volume.

The viewer's interaction with the integrated LF volume is natural in the sense that the viewer first focuses on the LF segment of interest just as they would naturally, then interacts with the LF using their hand gesture, similar to how they do naturally, to bring objects into their best view position, open and close items or move items or objects from the foreground to the background or vice versa.

Figure 4:
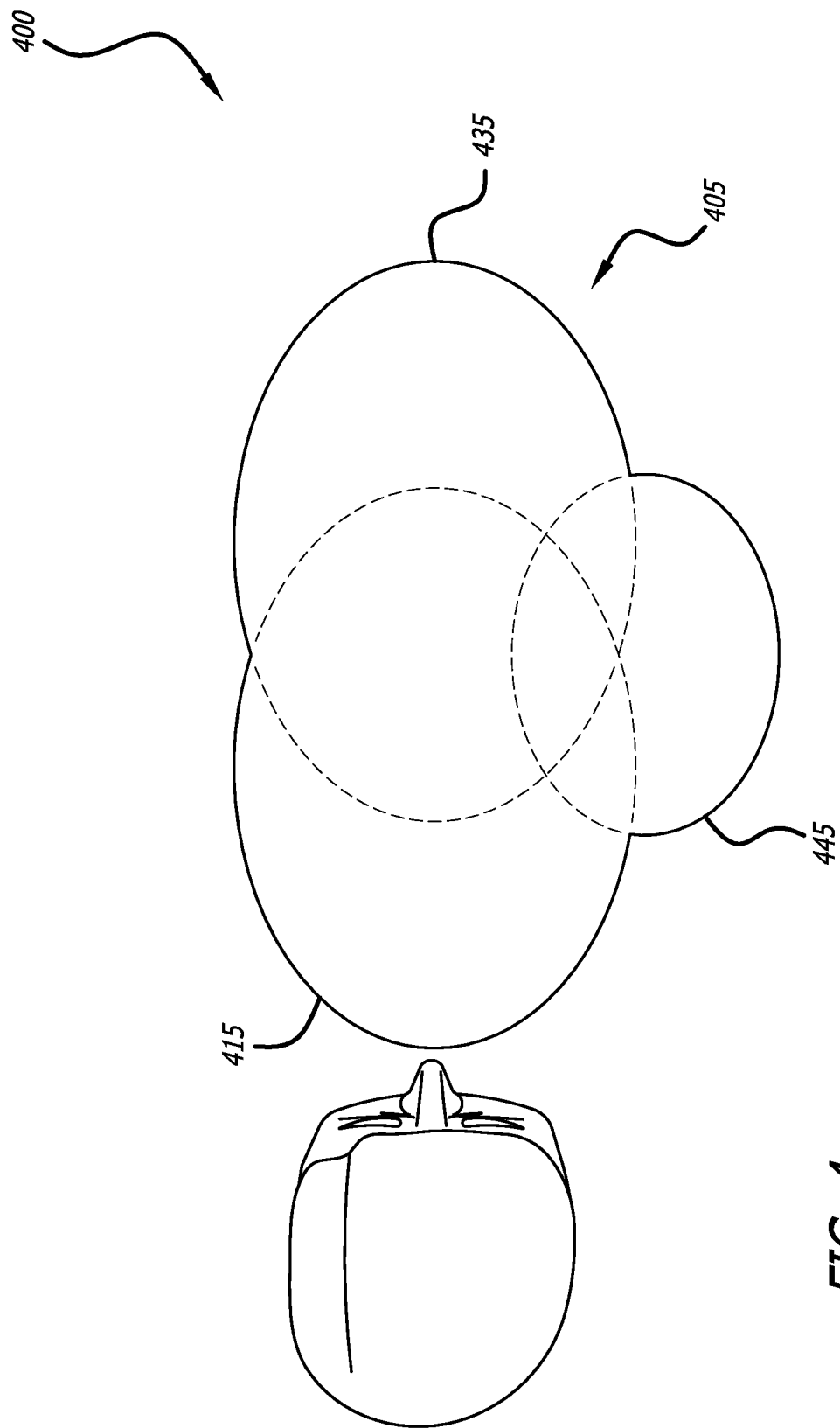
FIG. 4 illustrates an example for explaining a collective light field volume of the integrated light field display system of the embodiment of FIG. 3.

FIG. 4 illustrates an example of the collective light field volume 405 made available to the viewer using the near/far mobile LFD system of FIG. 3. Integrated LF volume 405 includes, for example, AR LF volume 415 displayed by near-eye augmented reality (AR) display 310, mobile LF volume 435 displayed by mobile device 330 and wearable LF volume 445 displayed by wearable device 340. Within each of the display volumes 415, 435, 445 of the three LF components shown in FIG. 4, the optical performance of the LF display in terms of resolution and Modulation Transfer Function (MTF) differ depending on the position of the viewer's eyes shown in FIG. 4 naturally closest to the AR/LF display relative to the modulation surface of the LF display. Typically, the display resolution and MTF would be at its highest value in the vicinity of the LF display modulation surface and falls off systematically with the increase of the viewer's eye distance from the LF display modulation surface (see FIGS. 2A and 2B). This results in the LF optical performance degrading for objects closer to the viewer when the LF modulation surface is farther away from the viewer's eyes (unnaturally, since one would expect an object close to the eye would have higher optical performance).

As used herein, a fully articulated light field segment (e.g., fully articulated LF segment 508 of FIG. 5) means a light field segment displayed with resolution that closely matches the HVS central foveal region. An abbreviated light field segment (e.g., abbreviated LF segment 509 of FIG. 5) may be displayed with a resolution that closely matches the HVS peripheral region.

With the collective light field volume shown in FIG. 4, the near/far LF display system is able to select which of the three display components is best-suited, in terms of optical performance MTF, to modulate the LF segment where the viewer is focused. The display function of the overall system is therefore distributed among the three LF display components and the fully-articulated segment of the LF where the viewer is focused is displayed (modulated) by the LF component that provides the highest optical performance in terms of resolution and MTF to the viewer.

For example, if the viewer is focused on an object that is close to his or her eyes, the AR LFD modulates the fully articulated LF segment incorporating the object the viewer is focused on. On the other hand, if the viewer is focused on an object far from the eyes, the mobile LFD modulates the fully-articulated segment incorporating the object where the viewer is focused. This way, the objects or depth the viewer is focused on will always be at the highest optical performance whether the viewer is focused in the near or far part of the light field volume (see FIG. 2C).

An added advantage is that the viewer mobile environment display capabilities are the integrated capabilities of the three LF display components. In this regard, the three LF display components contribute to what is being displayed to the viewer within the LF volume by virtue of the fact that the three LF display components are functionally integrated. The three LF display components, guided by the viewer's interaction using focus and gesture, work together to create a single and cohesive LF display volume 405. Accordingly, the resolution and the volume of the integrated near/far LF display system disclosed herein transcends the capabilities of any one of the three display components standing alone.

FIG. 5 is an exemplary block diagram illustrating the near/far integrated light field display system of FIG. 3. As illustrated in FIG. 5, the integrated light field display system 500 includes three LF display components, namely the near-eye AR LF display 502 (e.g., 310 of FIG. 3), the mobile LF display 504 (e.g., 330 of FIG. 3), and the smartwatch LF display 505 (e.g., 340 of FIG. 3). The three LF display components are interconnected, for example through a wireless personal area wireless network (WL-PAN) to the light field processor (LFP) 501 which may be collocated within the mobile device 530 together with the mobile LF display component 504.

Utilizing a mobile wireless wide area network (W-WAN) or local area network (W-LAN) interfaces of the mobile device 530, the LF processor 501 interfaces with the internet 550 for retrieving streaming LF videos and content from a content provider server across the internet 550. The LF processor 501 may incorporate the capability to query the content server interactively to retrieve LF segment just-in-time for display. The LF processor 501 may include the capabilities to decompress, render and re-compress the light field data it receives across the interface to the internet 550 and provide or distribute the appropriate set of LF data to each of the three display components 502, 504, 505 as described earlier.

As also shown in FIG. 5, a HVS head and eye tracking sensor system 503 is collocated with the AR LF display 502 which may be worn on the viewer's head 507 like a pair of glasses. As previously discussed, head and eye tracking sensor system 503 may determine the direction, depth and focus of the viewer. The HVS sensor output is also relayed through the AR LF display interface (W-PAN) to the LF processor 501. FIG. 5 also shows the gesture sensor 506 that may be collocated with the smartwatch LF display 505 with its output interfacing to the LF processor 530 through the W-PAN connection between the smartwatch display 505 and the mobile device 530 where the LF processor 501 is collocated.

These interfaces are all illustrated in FIG. 5 as interconnect lines between the three LF display components and the two sensor components. Functionally, the master frame of reference for the LF display volume 550 is established by the HVS tracking sensor 503 collocated with the AR LF display component 502. The reason is to set the LF display volume reference coordinate to be relative to the position of HVS tracking sensor 503. In one embodiment, all three LF display components 502, 503, 505 have a position sensor and are interconnected through the wireless PAN, such that the relative position of all three LF display components is known to or communicated to the light field processor (LFP) 501 periodically. This can be accomplished using simple triangulation calibration with the viewer initially interacting with the integrated LF display system 500 within preset positions to calibrate the relative positions of the three LF display components and thereafter these position coordinates being updated periodically when the LF processor receives position and orientation updates from all three components of the system.

Figure 6:
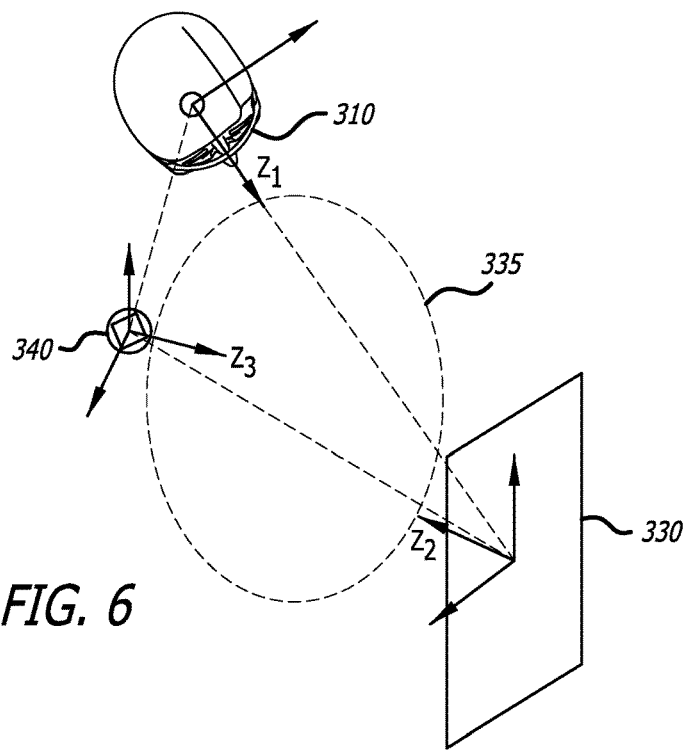
FIG. 6 illustrates an example for explaining a coordinate system used by a light field processor (LFP) of the integrated light field display system of the embodiment of FIG. 3.

FIG. 6 illustrates an example coordinate system that may be used by a light field processor. In particular, FIG. 6 illustrates example coordinates and relative positions of the three components of the integrated light field display, such as the three light field display components of FIG. 3, and illustrates how the relative positions may be triangulated by the light field processor (LFP) primarily to define the integrated LF display volume 335. As illustrated in FIG. 6, once the position of the three display components is calibrated and triangulated by the LF processor, the contribution of each LF display component into the integrated LF display volume 335 (e.g., as shown in FIG. 4) may be established and known to the LFP.

With the relative position of the three LF display components known and tracked by the LFP, their contribution to the LF display volume is continuously computed and tracked by the LFP. When the viewer focuses on an object or a region within the integrated LF display volume, the LFP computes the position of that object or focus region within the integrated LF display volume then subsequently also computes or estimates the performance metric, for example resolution or MTF, of each LF display component within that focus region, then decides the degree of which, in terms of the level of LF articulation, each of the three LF display components contribute to displaying the highest quality LF to the viewer whether the focus region is near or far relative to the viewer's HVS frame of reference.

In doing so, the LFP computes an optical performance metric from each LF display component to the focus region of the viewer. The LFP may also compute the registration of each of the three light field display components to blend the contribution of the three light field display components together and with the ambient light field in color, brightness and geometry seamlessly within the viewer's focus region. In addition, the LFP may also compute a light field color and brightness metric that needs to be satisfied within the viewer's focus region, then adjust the contribution into the focus zone of all the three light field display components' color and brightness in order to achieve the light field uniformity metric within the viewer's zone. In doing so, the LFP may also incorporate the output of an ambient light or scene sensor that may be located or collocated with any of the three LF display components. For example, on either or both of the AR LF display and/or mobile LF display may be a collocated ambient scene sensor such as a camera that may sense the light brightness, color and uniformity (shades and shadows) with the LF display volume. Such sensed ambient light environment (within the LF display volume at large and in particular within the viewer's focus region) may be incorporated by the LFP into the LF display components' LF contribution in order to achieve the target LF uniformity metric. The net result would be presenting to the viewer a unified LF volume modulated by the three LF display components collectively and cooperatively that is seamless within itself and relative to the ambient light field environment in which it is being displayed that is in addition to presenting the viewer with the highest possible optical performance and viewing experience regardless of where in the light field the user is focused.

In some sense, the three components of the LF display may augment each other and collectively augment the ambient LF to present the viewer with the highest possible performance in viewing experience in viewing the collective light field (collective light field referring to the integrated light field displayed by the multiple components of the LF display system and the ambient LF of the viewer). Similarly, when the viewer interacts with the light field using the gesture features of the LF display system, the LFP may receive the output from the gesture sensor collocated with the smartwatch LF display and worn on the viewer's hand, then locate and use this information to compute the user's hand position within the light field, then compute the position of the viewer's hand, palm, thumb and fingers within the light field and with respect to the LF contents being displayed. The LFP may then interpret the viewer's hand and thumb/fingers gesture using a preset code of gestures to interact, modify, alter or move the contents of the light field displayed within the integrated light field volume modulated by the three LF display components. The net result is the display of a high quality light field that is cooperatively modulated by the three LF components and interacted with via the viewer's focus and gesture actions relayed by the two sets of sensor integrated with the LF display components.

Figure 7:
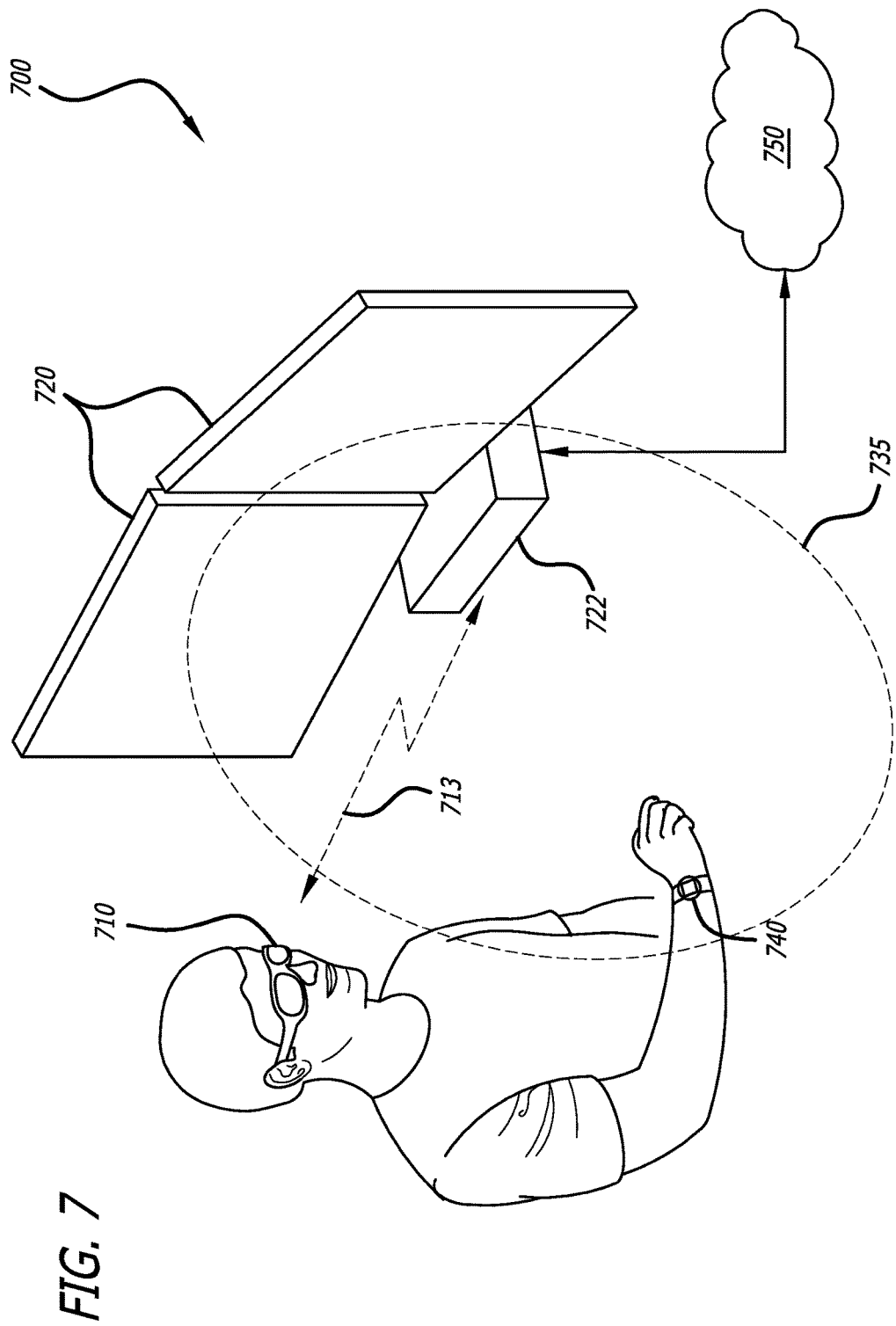
FIG. 7 illustrates an example for explaining an integrated light field display system in a workstation environment according to an embodiment.

Integrated LF Work Station:

FIG. 7 illustrates an embodiment of an integrated light field display system in a workstation scenario. As depicted in FIG. 7, the near/far light field display system 700 may include three LF components:

1. Near eye AR light field display 710 and,
2. Multi-panel (e.g., at least two panels or single immersive curve panel) LF display 720.

The AR LFD 710 may be worn by a workstation user on or near the user's head and may incorporate a head and eye tracking sensor and interface capabilities. In one embodiment, integrated light field display system 700 may also include a wrist worn (e.g., 740) or handheld gesture sensor with wireless interface capabilities. The light field display elements and the sensor elements may be interconnected via wireless personal area network (WPAN) interface capabilities incorporated as an integral part of each element and the light field display elements may each contribute to a portion of collective light field volume 735.

The multi-panel LF display may be connected to a workstation computer where the light field processor (LFP) 722 may be collocated. As previously mentioned, the AR LFD component 710 may have collocated with it a wireless interface, either W-PAN or W-LAN, and a HVS (head and eye) track sensor. The AR LFD component 710 may also be collocated with an ambient light and/or scene sensor which may be a camera. The LFP 722 may interface wirelessly via wireless connection 713 with the AR LFD component 710. The user or viewer may also wear a hand or wrist band 740 that incorporates a gesture sensor (e.g., a smartwatch).

In this embodiment, the user/viewer may use a hand-held sensor that allows the sensing of the palm as well as user thumb/finger configuration. The gesture sensor may be hand/wrist wearable to allow free-thumb/finger gesture. The gesture sensor may be able to sense the palm and the user's thumb/finger configuration. A position sensor (micro gyro/accelerometer) may also be integrated with the gesture assembly that senses the position of the user's hand when the gesture sensor is worn. A W-PAN interface device may be integrated with the gesture assembly to allow the gesture sensor to relay its output to both the LF processor (LFP) as well as the AR LFD if necessary.

The functionality of the LFP may be very similar to what was previously described herein in connection with other embodiments. In this embodiment, the LFP may interface with the internet or cloud 750 such as through a wireless or wired LAN. Also in this embodiment, since the multi-panel LF display 720 may support a much higher resolution as compared to other displays, the LF processor may have much higher throughput and memory capacity than other embodiments.

Figure 8:
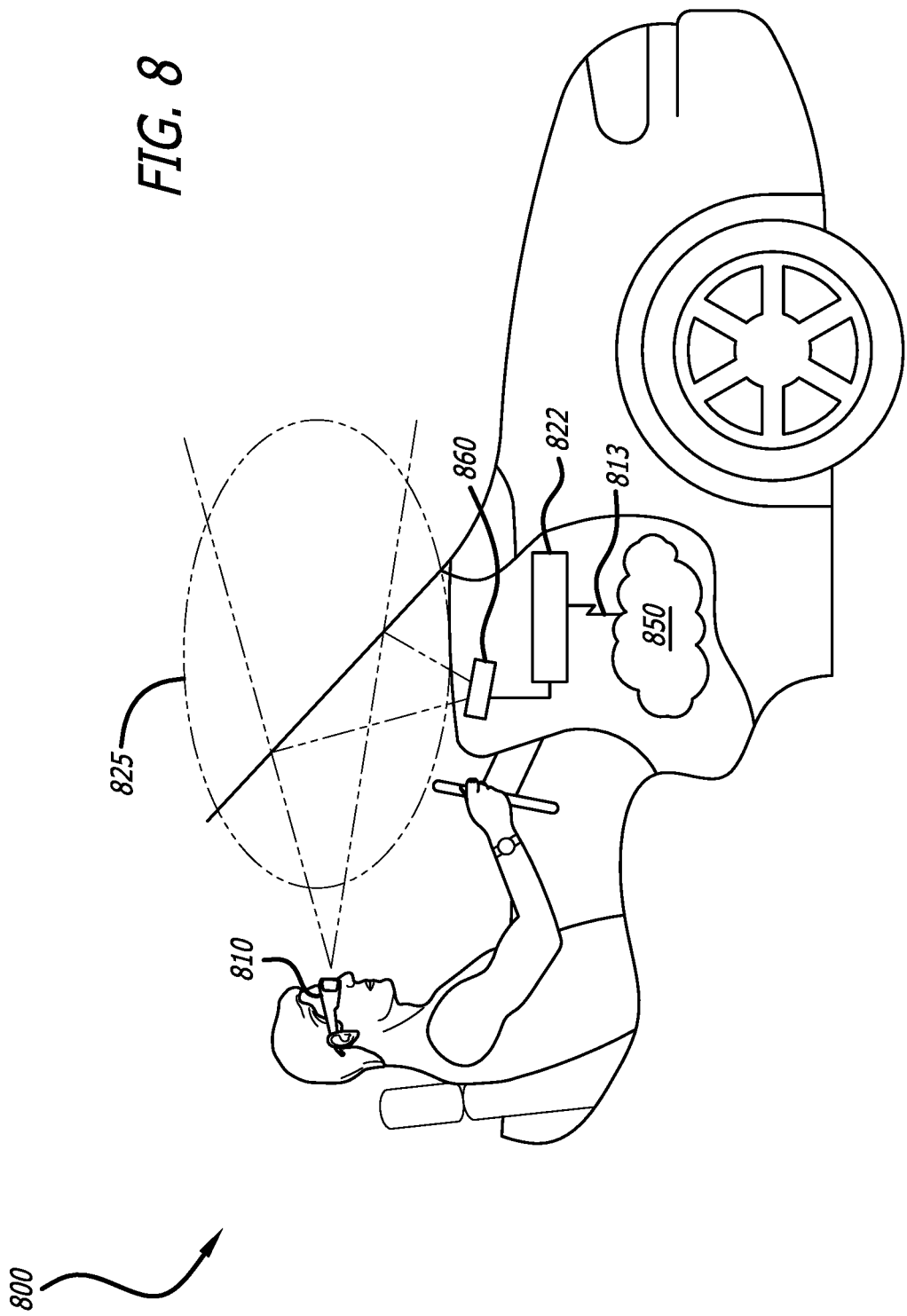
FIG. 8 illustrates an example for explaining an integrated light field display system in an automotive environment including a head-up display (HUD) according to an embodiment.

Integrated Head-Up LF Display:

FIG. 8 illustrates an example of a near/far integrated light field display system in an automotive scenario. As shown in FIG. 8, integrated light field display system 800 may include:

1. Automotive LF heads-up light field display (LF HUD) 860; and
2. Near-eye augmented reality (AR) light field (LF) display 810.

The near-eye augmented reality (AR) LFD 810 may be worn by an automobile driver on or near the head. AR LFD 810 may incorporate a head and eye tracking sensor and interface capabilities. The automobile driver may interact with the collective light field volume 825 modulated by the AR and HUD light field display elements 810 and 860 either visually, by gesture or through hands-free voice control.

The automotive LF HUD 860 may be connected to the LF processor (LFP) 822 through the automobile interconnect system and the LFP 822 may be connected via a wireless PAN to the AR LFD 810. The LFP 822 may also be connected to the internet or cloud 850 through the automotive information system wireless interface 813. The LFP 822 operates in a manner similar to that described herein in connection with other embodiments. For example, LFP 822 may obtain the position of each display element and compute the light field contribution of each display element to the collective light field volume. The light field processor may visually articulate the appropriate portion of the integrated light field based on the viewer's visual and/or gesture cues to modulate that light field segment at the highest possible optical performance.

The integrated light field display system 800 may also include a wrist-worn or handheld gesture sensor with wireless interface capabilities. The light field elements and the sensor elements may be interconnected via a wireless personal area network (W-PAN) interface capabilities incorporated as an integral part of each element.

Figure 9:
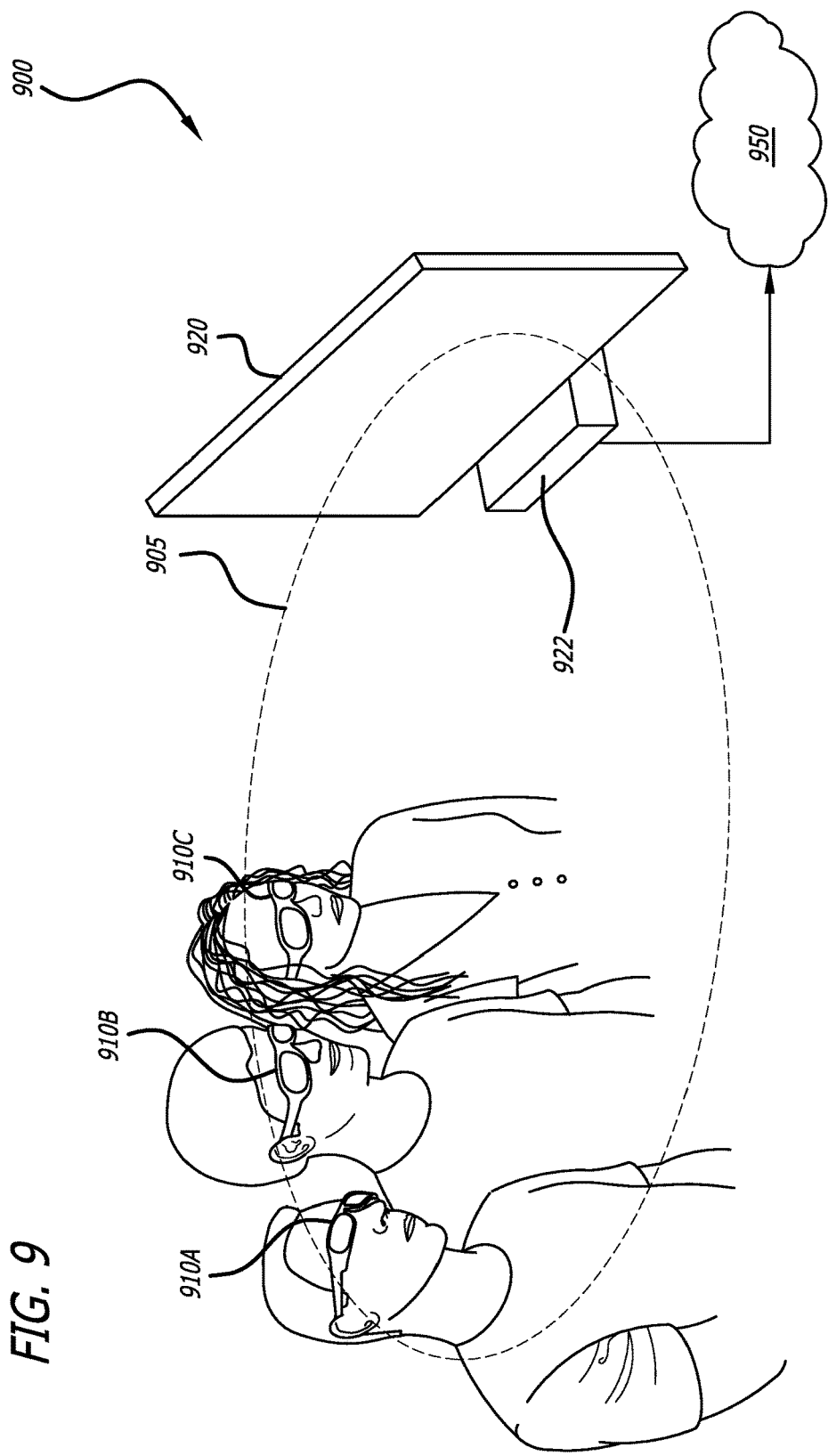
FIG. 9 illustrates an example for explaining an integrated light field display system in a home entertainment environment according to an embodiment.

Integrated Home Entertainment LF Display:

FIG. 9 illustrates an example of an integrated light field display system in home entertainment scenario. As depicted in FIG. 9, an integrated light field display system 900 may include:

1. Direct view home entertainment light field display 920; and
2. Multiplicity of near-eye AR LF displays 910 (individually, 910A, 910B, 910C).

FIG. 9 illustrates the integrated light field display system 900 being comprised of a plurality of near-eye augmented reality (AR) light field displays 910 worn by multiple viewers and a direct view light field home entertainment display 920. Each of the AR LFD elements 910 may be worn on or near the head of a viewer and may incorporate a head and eye tracking sensor and wireless interface capabilities. The viewers may interact with the collective light field volume 905 modulated by the integrated light field display system 900 either visually, or through a wrist-worn or handheld gesture sensor incorporating wireless interface capabilities. The integrated light field display system 900 may include an LFP 922 in communication with the internet or cloud 950. The LFP 922 operates in a manner similar to that described herein in connection with other embodiments. For example, LF processor 922 may obtain the position of each display element and compute the light field contribution of each display element to the collective light field volume. The LFP 922 may visually articulate the appropriate portion of the integrated light field based on the viewers' visual and/or gesture cues to modulate that light field segment at the highest possible optical performance.

Integrated Cinema and Large Venue LF Display:

FIG. 10 illustrates an example of the integrated light field display in a cinematic entertainment scenario. As depicted in FIG. 10, an integrated light field display system 1000 may include:

1. Direct-view large venue LF display 1020; and
2. Multiplicity of near-eye AR LF displays 1010 (individually, 1010A-1010N).

FIG. 10 illustrates integrated light field display system 1000 comprised of a plurality of near-eye augmented reality (AR) Light Field Displays 1010 worn by multiple viewers and a direct-view Light Field Display 1020 being viewed by the multiple viewers. Each of the AR light field display elements 1010 may be worn on or near a head of the viewer and may incorporate a head and eye tracking sensor and wireless interface capabilities. The integrated light field display system 1000 may include an LF processor (LFP) 1022 coupled to the internet or cloud 1050, or to a local server. The LF processor 1022 operates in a manner similar to that described herein in connection with other embodiments. For example, LF processor 1022 may obtain the position of each display element and compute the light field contribution of each display element to the collective light field volume. The light field processor may visually articulate the appropriate portion of the integrated light field based on the viewer's visual and/or gesture cues to modulate that light field segment at the highest possible optical performance.

The viewers may interact with the collective light field volume 1005 modulated by the integrated light field display system 1000 visually. Such visual interaction (e.g., through focus by individual viewers) allows each viewer to independently focus on objects of their interest within the LF display volume 1005 to experience a personal close-in viewing experience.

The integrated LF display context illustrated in FIG. 10 may also be a concert or theater hall with the audience being communicatively coupled (e.g., via wireless connection 1013) to the LF processor 1022 to receive multiple perspectives of the LF captured by multiple cameras of the concert or theatrical play being performed. Such multiple perspectives of the concert or theatrical play may be captured by multiple cameras having different perspectives of the stage. The multiple cameras may be communicatively coupled (connected either by wire or wirelessly) to the LF processor to provide real-time LF capture of the performance on the stage. The viewers may interact with the collective light field volume 1005 modulated by the integrated light field display system 1000 visually by focusing on region or objects on the stage performance or what is being displayed on a large venue LF display 1020 displaying the captured LF of the stage performance. Such visual interaction (through focus by individual viewers) allows each viewer to independently focus on objects of their interest within the LF display volume 1005 to experience a personal close-in viewing experience of the stage entertainment being performed on the stage.

The integrated LF display context illustrated in FIG. 10 could also be a sports arena or stadium venue with the audience being communicatively coupled (e.g., connected wirelessly) to the LFP 1022 to receive multiple perspectives of the LF captured by multiple cameras of the sport event or theatrical play being performed. Such multiple perspectives of the sport event may be captured by multiple cameras having different perspectives of the sport arena or the field of the stadium. The multiple cameras may be communicatively coupled (e.g., connected either by wire or wirelessly) to the LFP 1022 to provide real-time LF capture of the game being played. The viewers may interact with the collective light field volume 1005 modulated by the integrated light field display system 1000 visually by focusing on a region or objects on the sport area or the field of the stadium or what is being displayed on a large venue LF display 1020 displaying the captured LF on one or more direct view large venue LF displays being visually accessible to the spectators. Such visual interaction (through focus by individual viewers) allows each of the spectators to independently focus on objects of their interest within the LF display volume to experience a personal, close-in viewing experience of the sport event.

The embodiment of FIG. 10 therefore provides a light field that is personally focusable by a viewer, as well as visual interaction for a personal close-in focus experience.

Integrated Light Field General Use Scenario:

A general use scenario of the integrated light field display system of the invention encompasses a multiplicity of the aforementioned embodiments whereby the AR LFD typically used by (mobile) users is compatible with (or can support) the described interface and cooperative (or distributed) processing of the integrated LFD system as well as the typical visual interface devices, e.g., the mobile device, the HUD, workstation, the home entertainment system, commercial venues display, etc., encountered by the AR LFD users in their typical daily activities. This enables the users of the integrated LFD compatible AR LFD to seamlessly integrate visually with a virtual light field environment of any of the integrated LFD compatible visual devices they encounter in their daily activities in order to enable richer visual light field experience for the users of the AR LFD.

Many alterations and modifications may be made by those having ordinary skill in the art without departing from the spirit and scope of the disclosure. Therefore, it must be understood that the illustrated embodiment has been set forth only for the purposes of example and that it should not be taken as limiting the disclosure as defined by any claims in any subsequent application claiming priority to this application.

For example, notwithstanding the fact that the elements of such a claim may be set forth in a certain combination, it must be expressly understood that the disclosure includes other combinations of fewer, more or different elements, which are disclosed in above even when not initially claimed in such combinations.

The words used in this specification to describe the disclosure and its various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a subsequent claim must be understood as being generic to all possible meanings supported by the specification and by the word itself.

The definitions of the words or elements of any claims in any subsequent application claiming priority to this application should be, therefore, defined to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements in such claims below or that a single element may be substituted for two or more elements in such a claim.

Although elements may be described above as acting in certain combinations and even subsequently claimed as such, it is to be expressly understood that one or more elements from a claimed combination can in some cases be excised from the combination and that such claimed combination may be directed to a subcombination or variation of a subcombination.

Insubstantial changes from any subsequently claimed subject matter as viewed by a person with ordinary skill in the art, now known or later devised, are expressly contemplated as being equivalently within the scope of such claims. Therefore, obvious substitutions now or later known to one with ordinary skill in the art are defined to be within the scope of the defined elements.

Any claims in any subsequent application claiming priority to this application are thus to be understood to include what is specifically illustrated and described above, what is conceptually equivalent, what can be obviously substituted and also what essentially incorporates the essential idea of the disclosure.

What is claimed is:

1. An integrated light field display system comprising:
a first light field display element configured to display a near-field light field segment of a collective light field volume, the collective light field volume comprising a predetermined set of optical performance light field characteristics;
a second light field display element configured to display a far-field light field segment of the collective light field volume; and
a light field processor communicatively coupled to the first and second light field display elements and configured to:
determine, within the collective light field volume, a three-dimensional position of the first light field display element and a three-dimensional position of the second light field display element,
determine, based on which light field segment is focused on by a viewer, a modulation transfer function of the first light field display element and a modulation transfer function of the second light field display element; and
modulate at least one of the near-field and far-field light field segments based on at least one of the determined modulation transfer functions.

2. The integrated light field display system of claim 1 wherein the first light field display element comprises a near-eye wearable optical see-through glasses device.

3. The integrated light field display system of claim 1 wherein the first light field display element comprises a near-eye wearable optical see-through glasses device configured to operate as an augmented reality display.

4. The integrated light field display system of claim 1 wherein the first light field display element comprises at least one of a visual or location sensor configured to localize the viewer within the collective light field volume.

5. The integrated light field display system of claim 1 wherein the first light field display element is further configured to include a simultaneous localization and mapping capability that localizes the viewer within the collective light field volume.

6. The integrated light field display system of claim 1 wherein the first light field display element comprises at least one of a viewer eye-gaze tracking sensor, an interpupillary distance sensor and a head orientation sensor configured for determining a location of a viewer's focus within the collective light field volume.

7. The integrated light field display system of claim 6 further comprising a gesture control device configured to enable the viewer to interact with the collective light field volume.

8. The integrated light field display system of claim 1 wherein the second display element is communicatively coupled to the first display element.

9. The integrated light field display system of claim 1 wherein the integrated light field display system is communicatively coupled to an external content source and is configured to receive from the external content source streaming of light field display content for display in the collective light field volume.

10. The integrated light field display system of claim 1 wherein the first light field display element is further configured to operate at a first light field display resolution, wherein the second display element is configured to operate at a second light field display resolution that is lower than the first light field display resolution, and wherein the first light field display resolution is complementary to the second light field display resolution.

11. The integrated light field display system of claim 1 wherein the first light field display element is further configured to operate at a first light field display resolution, wherein the second display element is configured to operate at a second light field display resolution that is higher than the first light field display resolution, and wherein the second light field display resolution is complementary to the first light field display resolution.

12. The integrated light field display system of claim 1 wherein a plurality of views of the collective light field volume being modulated by the second light field display element are dynamically adjusted to correspond to a number and a location of each of a plurality of viewers engaging the integrated light field display system.

13. The integrated light field display system of claim 1 wherein the collective light field volume is modulated at a first angular resolution by the second light field display element, and wherein in response to a viewer depth or a vergence being detected, an object in the collective light field volume is brought into a second angular resolution that is higher than the first angular resolution by the first light field display element.

14. The integrated light field display system of claim 1 wherein the collective light field volume is angularly partitioned.

15. The integrated light field display system of claim 1 wherein the collective light field volume is volumetrically partitioned.

16. The integrated light field display system of claim 1 wherein the first light field display element comprises a wearable near-eye augmented reality device and the second light field display element comprises a mobile phone device including a light field display.

17. The integrated light field display system of claim 16 further comprising a gesture control element configured to enable the viewer to interact with the collective light field volume.

18. The integrated light field display system of claim 17 wherein the gesture control element comprises a light field display element and is communicatively coupled with the first and second light field display elements and the light field processor.

19. The integrated light field display system of claim 18 wherein the light field processor is configured to determine and adjust a contribution of a color and a brightness of each of the first and second light field display elements and the light field display element of the gesture control element to a focus zone of the viewer.

20. The integrated light field display system of claim 1 wherein the second light field display element comprises a head-up light field display.

21. The integrated light field display system of claim 1 wherein the first light field display element is a wearable near-eye augmented reality device and the second light field display element is comprised of a multi-panel light field display.

22. A method for integrated light field display, the method comprising:
  displaying a near-field light field segment of a collective light field volume, the collective light field volume comprising a predetermined set of optical performance light field characteristics;
  displaying display a far-field light field segment of the collective light field volume;
  determining, within the collective light field volume, a three-dimensional position of the first light field display element and a three-dimensional position of the second light field display element,
  determining, based on which light field segment is focused on by a viewer, a modulation transfer function of the first light field display element and a modulation transfer function of the second light field display element; and
  modulating at least one of the near-field and far-field light field segments based on at least one of the determined modulation transfer functions.

23. The method of claim 22 further comprising determining coordinates of a location of the viewer within the collective light field volume.

24. The method of claim 22 further comprising receiving at least one of viewer eye-gaze tracking information, interpupillary distance information and head orientation information for determining a location of a viewer's focus within the collective light field volume.

25. The method of claim 22 further comprising receiving gesture control information to enable the viewer to interact with the collective light field volume.

26. The method of claim 22 further comprising receiving from an external content source streaming of light field display content for display in the collective light field volume.

27. The method of claim 22 wherein the near-field light field segment is displayed at a first light field display resolution, wherein the far-field light field segment is displayed at a second light field display resolution that is lower than the first light field display resolution, and wherein the first light field display resolution is complementary to the second light field display resolution.

28. The method of claim 22 wherein the near-field light field segment is displayed at a first light field display resolution, wherein the far-field light field segment is displayed at a second light field display resolution that is higher than the first light field display resolution, and wherein the second light field display resolution is complementary to the first light field display resolution.

29. The method of claim 22 wherein a plurality of views of the collective light field volume being modulated with respect to the far-field light field segment are dynamically adjusted to correspond to a number and a location of each of a plurality of viewers engaging with integrated light field display.

30. The method of claim 22 wherein the collective light field volume is modulated at a first angular resolution with respect to the far-field light segment, and wherein in response to a viewer depth or a vergence being detected, an object in the collective light field volume is brought into a second angular resolution that is higher than the first angular resolution with respect to the near-field light segment.

31. The method of claim 22 wherein the collective light field volume is angularly partitioned.

32. The method of claim 22 wherein the collective light field volume is volumetrically partitioned.

33. The method of claim 22 further comprising determining and adjusting a contribution of a color and a brightness of each of the near-field light field segment and the far-field light field segment to a focus zone of the viewer.

34. A non-transitory machine-readable medium having instructions stored thereon, which when executed by a processor, cause the processor to perform the following method for integrated light field display, the method comprising:
  displaying a near-field light field segment of a collective light field volume, the collective light field volume comprising a predetermined set of optical performance light field characteristics;
  displaying display a far-field light field segment of the collective light field volume;
  determining, within the collective light field volume, a three-dimensional position of the first light field display element and a three-dimensional position of the second light field display element,
  determining, based on which light field segment is focused on by a viewer, a modulation transfer function of the first light field display element and a modulation transfer function of the second light field display element; and
  modulating at least one of the near-field and far-field light field segments based on at least one of the determined modulation transfer functions.

35. The non-transitory machine-readable medium of claim 34, wherein the method further comprises determining coordinates of a location of the viewer within the collective light field volume.

36. The non-transitory machine-readable medium of claim 34, wherein the method further comprises receiving at least one of viewer eye-gaze tracking information, interpupillary distance information and head orientation information for determining a location of a viewer's focus within the collective light field volume.

37. The non-transitory machine-readable medium of claim 34, wherein the method further comprises receiving gesture control information to enable the viewer to interact with the collective light field volume.

38. The non-transitory machine-readable medium of claim 34, wherein the method further comprises receiving from an external content source streaming of light field display content for display in the collective light field volume.

39. The non-transitory machine-readable medium of claim 34, wherein the near-field light field segment is displayed at a first light field display resolution, wherein the far-field light field segment is displayed at a second light field display resolution that is lower than the first light field display resolution, and wherein the first light field display resolution is complementary to the second light field display resolution.

40. The non-transitory machine-readable medium of claim 34, wherein the near-field light field segment is displayed at a first light field display resolution, wherein the far-field light field segment is displayed at a second light field display resolution that is higher than the first light field display resolution, and wherein the second light field display resolution is complementary to the first light field display resolution.

41. The non-transitory machine-readable medium of claim 34, wherein a plurality of views of the collective light field volume being modulated with respect to the far-field light field segment are dynamically adjusted to correspond to a number and a location of each of a plurality of viewers engaging with integrated light field display.

42. The non-transitory machine-readable medium of claim 34, wherein the collective light field volume is modulated at a first angular resolution with respect to the far-field light segment, and wherein in response to a viewer depth or a vergence being detected, an object in the collective light field volume is brought into a second angular resolution that is higher than the first angular resolution with respect to the near-field light segment.

43. The non-transitory machine-readable medium of claim 34, wherein the collective light field volume is angularly partitioned.

44. The non-transitory machine-readable medium of claim 34, wherein the collective light field volume is volumetrically partitioned.

45. The non-transitory machine-readable medium of claim 34, wherein the method further comprises determining and adjusting a contribution of a color and a brightness of each of the near-field light field segment and the far-field light field segment to a focus zone of the viewer.

* * * * *